(12) United States Patent
Ueda et al.

(10) Patent No.: US 11,482,190 B2
(45) Date of Patent: Oct. 25, 2022

(54) INFORMATION PROCESSING APPARATUS, TRANSPORTATION APPARATUS, METHOD, AND PROGRAM

(71) Applicant: Sony Corporation, Tokyo (JP)

(72) Inventors: Arinobu Ueda, Tokyo (JP); Yasuyuki Kato, Tokyo (JP); Daisuke Ishii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 97 days.

(21) Appl. No.: 16/969,985

(22) PCT Filed: Feb. 13, 2019

(86) PCT No.: PCT/JP2019/005045
§ 371 (c)(1),
(2) Date: Aug. 14, 2020

(87) PCT Pub. No.: WO2019/163599
PCT Pub. Date: Aug. 29, 2019

(65) Prior Publication Data
US 2020/0402480 A1      Dec. 24, 2020

(30) Foreign Application Priority Data
Feb. 22, 2018   (JP) .............................. JP2018-029600

(51) Int. Cl.
*G09G 5/37*   (2006.01)
*G06Q 30/02*  (2012.01)
(Continued)

(52) U.S. Cl.
CPC ........... *G09G 5/37* (2013.01); *G06Q 30/0259* (2013.01); *G06Q 30/0266* (2013.01);
(Continued)

(58) Field of Classification Search
None
See application file for complete search history.

(56) References Cited

U.S. PATENT DOCUMENTS

| 10,242,457 B1 * | 3/2019 | Sibley ....................... G06T 7/73 |
| 2008/0236003 A1 * | 10/2008 | Raccah ................... G09F 21/04 |
| | | 40/466 |

(Continued)

FOREIGN PATENT DOCUMENTS

| JP | 10-207413 A | 8/1998 |
| JP | 11-024603 A | 1/1999 |

(Continued)

OTHER PUBLICATIONS

International Search Report and Written Opinion dated May 14, 2019 for PCT/JP2019/005045 filed on Feb. 13, 2019, 11 pages including English Translation of the International Search Report.

*Primary Examiner* — Yi Wang
(74) *Attorney, Agent, or Firm* — Xsensus LLP

(57) ABSTRACT

A configuration enables control of an image displayed on the display unit provided on the outer side of the transportation apparatus, such as a bus, resulting in increasing the degree of user attention and obtaining higher advertising effects. A display unit provided on an outer side of a transportation apparatus such as a bus; and an image control unit configured to execute control of a display image on the display unit, are included, and the image control unit executes control to change the display image on the display unit depending on a traveling state of the transportation apparatus. For example, the display image is varied depending on (Continued)

the states of whether the transportation apparatus is accelerating, decelerating, or constant speed traveling. Alternatively, an AR image using a real object near the transportation apparatus is generated for display.

17 Claims, 18 Drawing Sheets

(51) Int. Cl.
  *G06T 13/80*  (2011.01)
  *G07C 5/02*  (2006.01)
  *G09F 21/04*  (2006.01)
  *G06V 20/56*  (2022.01)
  *G06V 40/20*  (2022.01)
  *G09F 9/35*  (2006.01)

(52) U.S. Cl.
  CPC .............. *G06T 13/80* (2013.01); *G06V 20/56* (2022.01); *G06V 40/20* (2022.01); *G07C 5/02* (2013.01); *G09F 21/04* (2013.01); *G09F 21/048* (2013.01); *G09F 9/35* (2013.01); *G09G 2320/068* (2013.01); *G09G 2380/06* (2013.01); *G09G 2380/10* (2013.01)

(56) References Cited

U.S. PATENT DOCUMENTS

| | | |
|---|---|---|
| 2010/0179878 A1 | 7/2010 | Dawson |
| 2014/0040016 A1 | 2/2014 | Vanya |
| 2015/0294363 A1 | 10/2015 | Bhola |
| 2016/0140614 A1 | 5/2016 | Brubaker |
| 2019/0164266 A1* | 5/2019 | Kuo ........................ G06T 7/001 |
| 2021/0223870 A1* | 7/2021 | Levesque ................ G06F 3/014 |

FOREIGN PATENT DOCUMENTS

| | | |
|---|---|---|
| JP | 2004-279509 A | 10/2004 |
| JP | 2007-265125 A | 10/2007 |
| JP | 2009-530669 A | 8/2009 |
| JP | 2010-072713 A | 4/2010 |
| JP | 2011-118186 A | 6/2011 |
| JP | 2012-068481 A | 4/2012 |
| JP | 2015-192810 A | 11/2015 |
| JP | 2017181842 A | 10/2017 |
| WO | 2016/014966 A2 | 1/2016 |

* cited by examiner

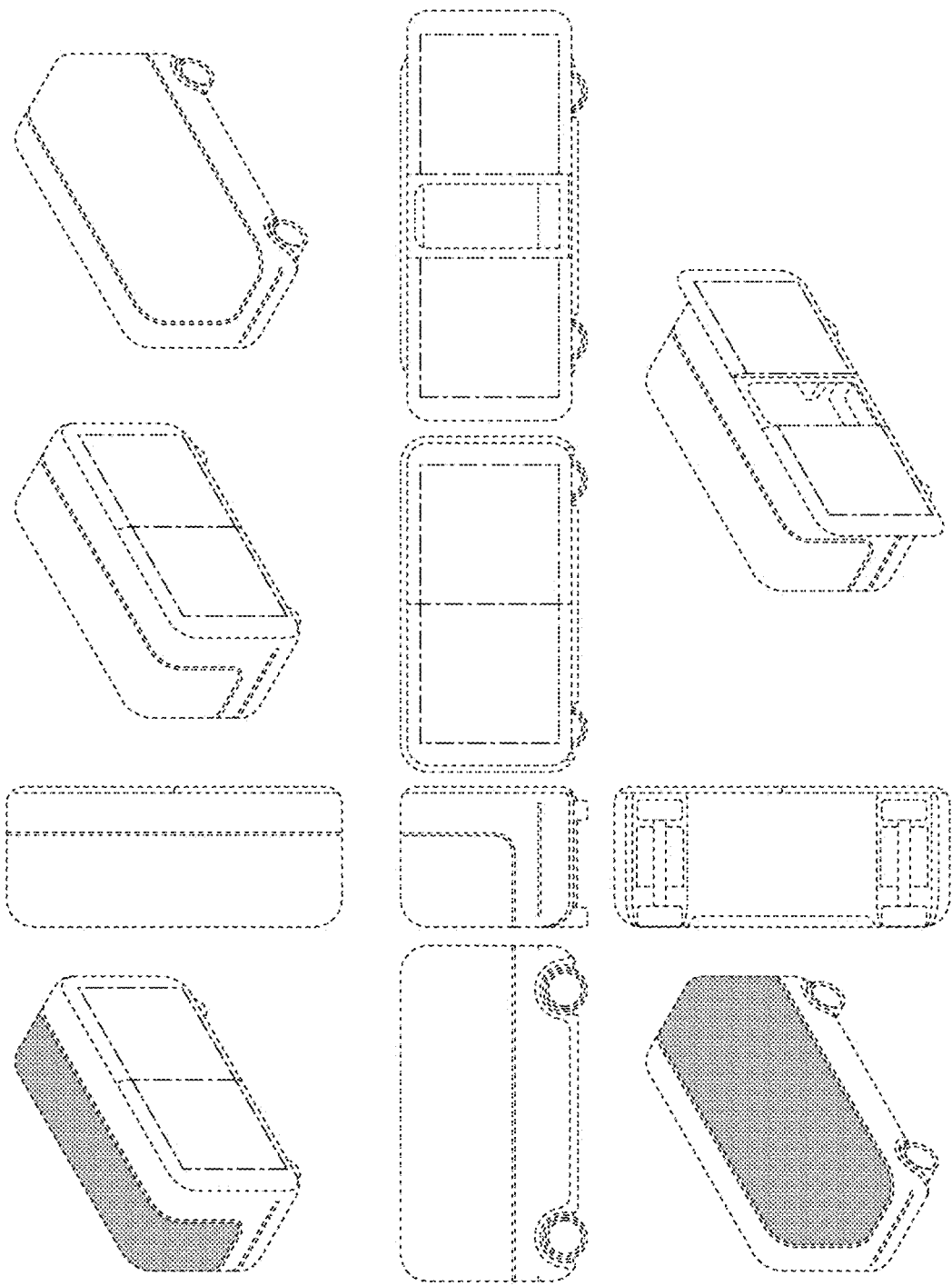

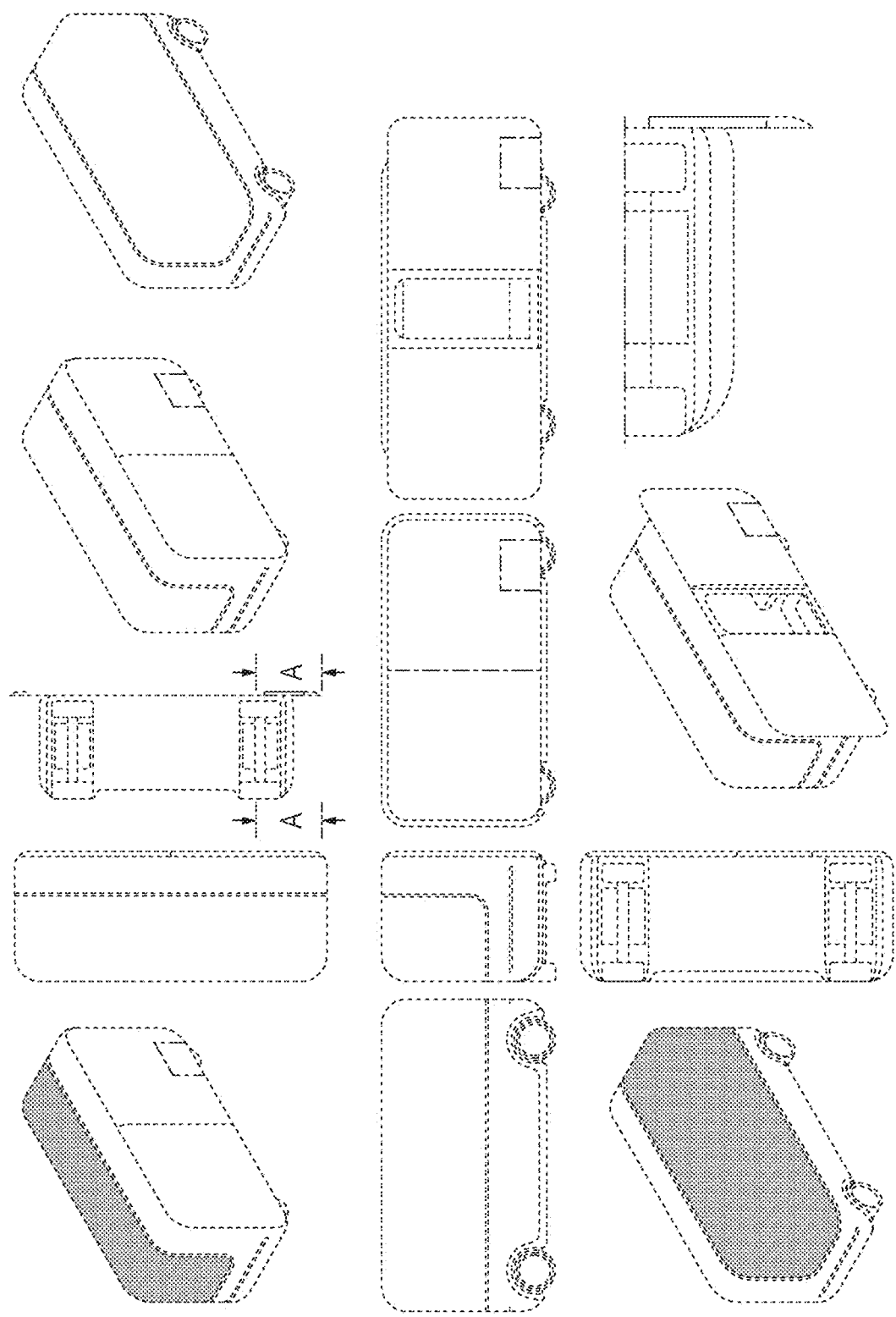

INFORMATION PROCESSING APPARATUS, TRANSPORTATION APPARATUS, METHOD, AND PROGRAM

CROSS-REFERENCE TO RELATED APPLICATIONS

The present application is based on PCT filing PCT/JP2019/005045, filed Feb. 13, 2019, which claims priority to JP 2018-029600, filed Feb. 22, 2018, the entire contents of each are incorporated herein by reference.

TECHNICAL FIELD

The present disclosure relates to information processing apparatuses, transportation apparatuses, methods, and programs. More specifically, the present disclosure relates to an information processing apparatus, transportation apparatus, method, and program, allowing display control of an output image on a display unit installed on an outer side of the transportation apparatus and execution of processing using a display image.

BACKGROUND ART

For example, there is an advertising technique displaying an advertisement image on a large display provided on the side of a vehicle and moving the vehicle in the downtown area and the like where many people gather thereby exposing the advertisement to more people.

For example, Patent Document 1 (JP 2015-184335 A) discloses a configuration of controlling a travel route of a moving object that presents an advertisement to obtain higher advertising effects.

CITATION LIST

Patent Document

Patent Document 1: Japanese Patent Application Laid-Open No. 2015-184335

SUMMARY OF THE INVENTION

Problems to be Solved by the Invention

Patent Document 1 mentioned above discloses the configuration of obtaining higher advertising effects by controlling the travel route. However, for example, it does not teach any configuration of controlling the display of an image displayed on the display unit of the moving object or performing various pieces of processing using the image to increase the degree of user attention.

The present disclosure is intended to provide an information processing apparatus, transportation apparatus, method, and program, capable of controlling the display of an image output on a display unit installed on the outer side of a transportation apparatus or performing various pieces of processing using the image, resulting in increasing the degree of user attention and further obtaining higher advertising effects.

Solutions to Problems

According to a first aspect of the present disclosure, there is provided an information processing apparatus including:

a display unit provided on an outer side of a transportation apparatus; and an image control unit configured to execute control of a display image on the display unit, in which the image control unit executes control to change the display image on the display unit depending on a traveling state of the transportation apparatus.

Further, according to a second aspect of the present disclosure, there is provided an information processing apparatus including:

a display unit provided on an outer side of a transportation apparatus;

an image control unit configured to execute control of a display image on the display unit; and a camera functioning as an image input unit configured to capture an image around the transportation apparatus, in which the image control unit executes control to change the display image on the display unit depending on a result obtained by analyzing a user around the transportation apparatus on the basis of the image captured by the camera.

Further, according to a third aspect of the present disclosure, there is provided a transportation apparatus including:

a display unit provided on an outer side of the transportation apparatus;

an image control unit configured to execute control of a display image on the display unit; and a sensor configured to detect a traveling state of the transportation apparatus, in which the image control unit executes control to change the display image on the display unit depending on the traveling state of the transportation apparatus analyzed from information detected by the sensor.

Further, according to a fourth aspect of the present disclosure, there is provided an information processing method executed in an information processing apparatus including an image control unit configured to execute control of a display image on a display unit provided on an outer side of a transportation apparatus, in which the image control unit executes control to change the display image on the display unit depending on a traveling state of the transportation apparatus.

Further, according to a fifth aspect of the present disclosure, there is provided an information processing method executed in a transportation apparatus including a display unit provided on an outer side of the transportation apparatus;

an image control unit configured to execute control of a display image on the display unit; and a sensor configured to detect a traveling state of the transportation apparatus, in which the image control unit executes control to change the display image on the display unit depending on the traveling state of the transportation apparatus analyzed from information detected by the sensor.

Further, according to a sixth aspect of the present disclosure, there is provided a program causing information processing to be executed in an information processing apparatus including an image control unit configured to execute control of a display image on a display unit provided on an outer side of a transportation apparatus, in which the program causes the image control unit to execute control to change the display image on the display unit depending on a traveling state of the transportation apparatus.

Note that the program of the present disclosure is, for example, a program that can be provided by a storage medium or a communication medium provided in a computer-readable form to an information processing apparatus or a computer system capable of executing various program codes. Such a program provided in the computer-readable form makes it possible for the processing in accordance with the program to be implemented on the information processing apparatus or the computer system.

Still other objects, features, and advantages of the present disclosure will become apparent from a detailed description based on embodiments of the present disclosure as described later and accompanying drawings. Note that the term "system" herein refers to a logical component set of a plurality of apparatuses and is not limited to a system in which apparatuses of the respective components are provided in the same housing.

Effects of the Invention

An embodiment of the present disclosure implements a configuration enabling control of an image displayed on the display unit provided on the outer side of the transportation apparatus, such as a bus, resulting in increasing the degree of user attention and obtaining higher advertising effects.

Specifically, for example, there are provided a display unit provided on the outer side of the transportation apparatus such as a bus and an image control unit configured to control a display image on the display unit. The image control unit controls to change a display image on the display unit depending on a traveling state of the transportation apparatus. For example, the display image is varied depending on the states of whether the transportation apparatus is accelerating, decelerating, or constant speed traveling. Alternatively, an AR image using a real object near the transportation apparatus is generated for display.

The present configuration enables control of an image displayed on the display unit provided on the outer side of the transportation apparatus, such as a bus, resulting in increasing the degree of user attention and obtaining higher advertising effects.

Note that the effects described in the present specification are merely examples and are not limited, and there may be additional effects.

BRIEF DESCRIPTION OF DRAWINGS

FIG. 17 is a diagram illustrated to describe in detail an exemplary configuration of a transportation apparatus.

FIG. 18 is a diagram illustrated to describe in detail an exemplary configuration of a transportation apparatus.

MODE FOR CARRYING OUT THE INVENTION

Figure 1:
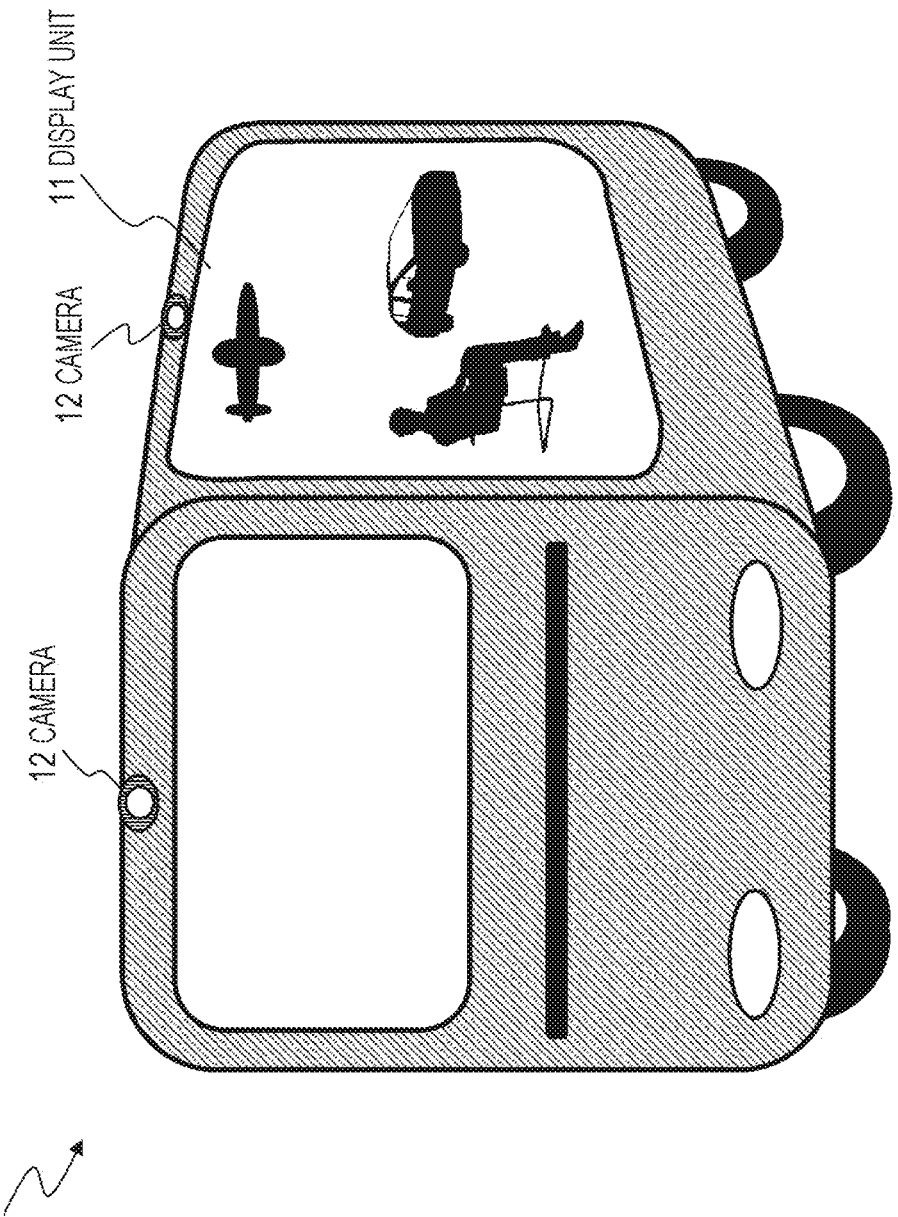
FIG. 1 is a diagram illustrated to describe an exemplary configuration of a transportation apparatus.

Hereinafter, details of each of an information processing apparatus, a transportation apparatus, a method, and a program of the present disclosure is now described with reference to drawings. Moreover, a description is made according to the following items.

1. An overview of transportation apparatus

2. Example of configuration of information processing apparatus

3. Specific processing example executed by information processing apparatus 3-(1). Example of cooperation processing among transportation apparatus, user equipment, and signage device 3-(2). Processing to control display image corresponding to traveling state of transportation apparatus 3-(3). Processing to display AR image using real object behind transportation apparatus 3-(4). Processing to display character or image corresponding to position of transportation apparatus 3-(5). Processing to display image corresponding to line-of-sight direction of user looking at display unit 3-(6). Processing to display advertisement image linked to shops around transportation apparatus 3-(7). Processing to provide service corresponding to action of user looking at display unit of transportation apparatus 3-(8). Other image display examples 4. Example of hardware configuration of information processing apparatus and information processing system 5. Example of hardware configuration of information processing apparatus 6. Example of detailed shape of transportation apparatus 7. Summary of configuration of present disclosure

[1. An Overview of Transportation Apparatus]

An overview of a transportation apparatus of the present disclosure is now described with reference to FIG. 1 and the following drawings.

FIG. 1 illustrates an embodiment of a transportation apparatus 10 of the present disclosure.

The transportation apparatus 10 illustrated in FIG. 1 is, for example, a vehicle such as bus, passenger car, or golf cart.

This can be either a typical vehicle that a driver drives or a self-driving vehicle enabling unmanned driving.

Moreover, the description below is given on the assumption that the transportation apparatus 10 is a vehicle, but the processing and configuration of the present disclosure are applicable to various transportation apparatuses such as logistic robots, ships, or flying objects.

As illustrated in FIG. 1, the transportation apparatus 10, such as a bus, is provided with a display unit 11 on the outer side thereof. For example, a thin display device such as LCDs and organic EL panels is provided. Furthermore, the transportation apparatus 10 is provided with a camera 12 that captures an image in each direction of the front, rear, left, and right of the transportation apparatus 10.

Figure 2:
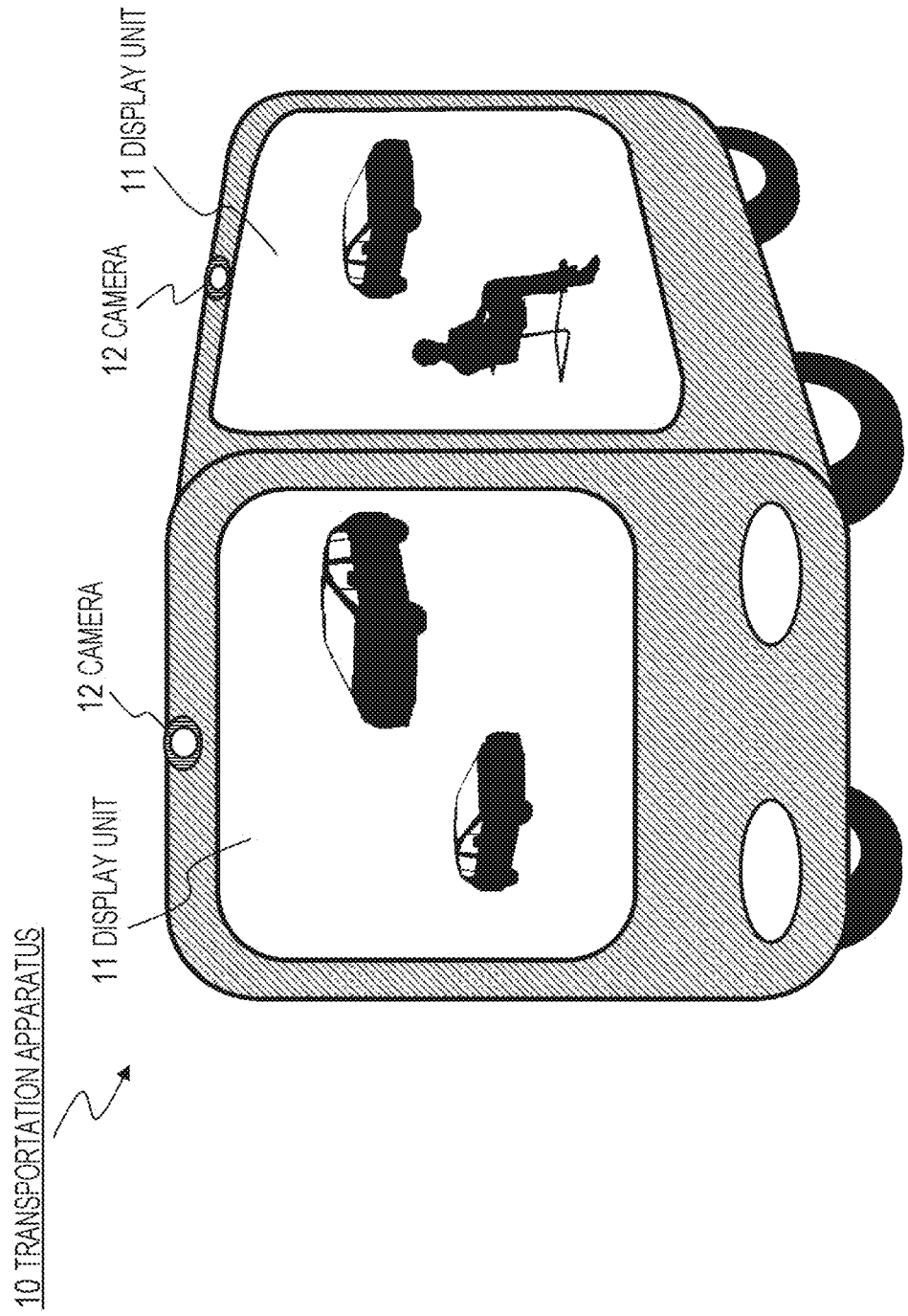
FIG. 2 is a diagram illustrated to describe an exemplary configuration of a transportation apparatus.

The example illustrated in FIG. 1 is an example in which the display unit 11 is installed on the side surface of the transportation apparatus 10. For example, as illustrated in FIG. 2, the display unit can be provided on the front surface and further on the rear surface of the transportation apparatus 10 or provided around the entire periphery of the transportation apparatus 10.

For example, in the case of a self-driving car, a driver is unnecessary because the vehicle's traveling is made on the basis of an image captured by a camera or information detected by a sensor. Thus, the driver is unnecessary to check the road ahead, so it is possible to provide the display unit instead of a window in the front.

Figure 3:
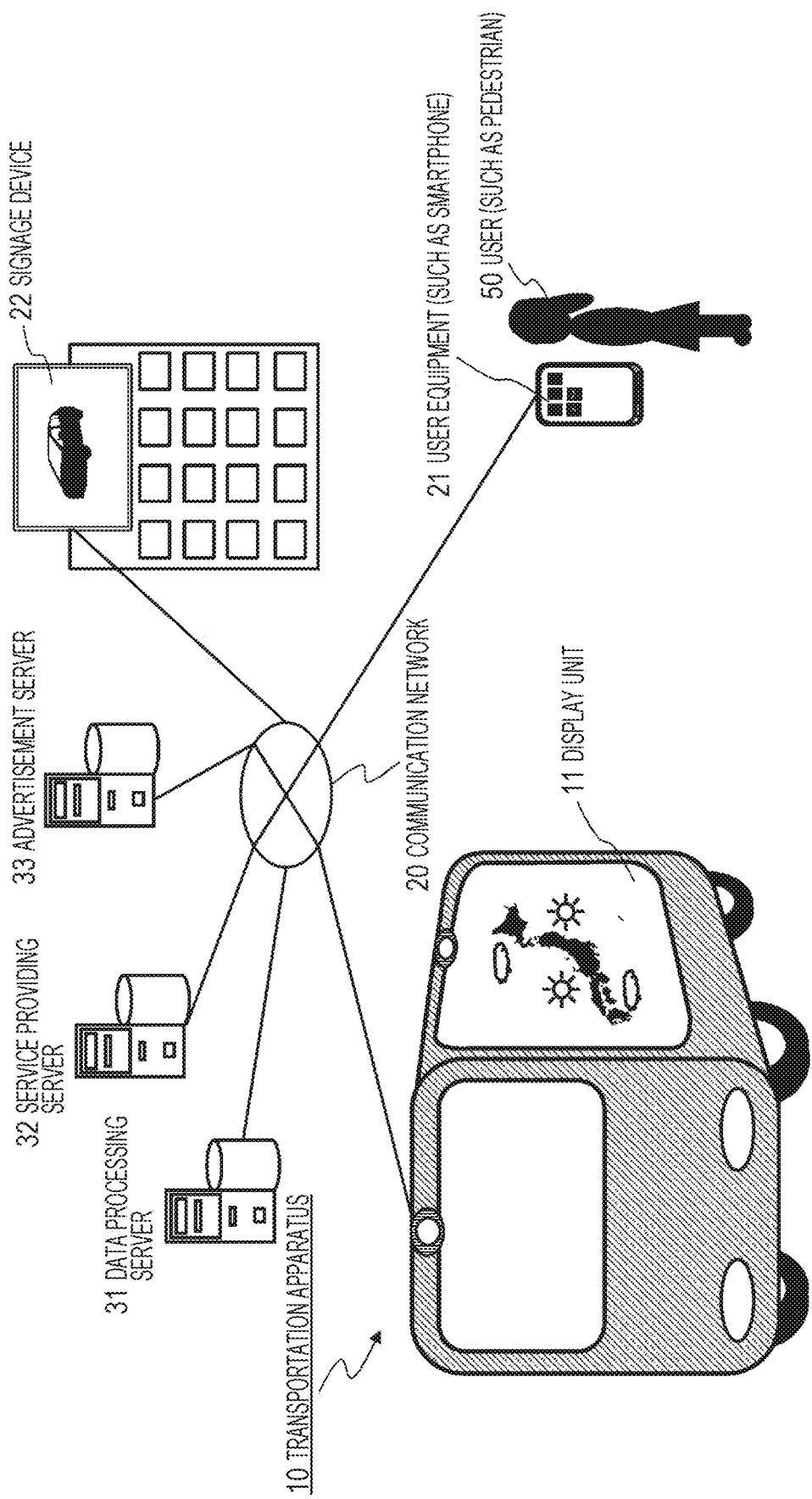
FIG. 3 is a diagram illustrated to describe an overview of an example of processing executed by a transportation apparatus and an exemplary configuration for communication.

FIG. 3 is a diagram illustrated to describe an example of a network connection configuration of the transportation apparatus 10.

The transportation apparatus 10 includes a communication unit configured to perform wireless communication. The transportation apparatus 10 has a configuration capable of communicating with various cloud-side devices including user equipment 21, a signage device 22, a data processing server 31, a service providing server 32, an advertisement server 33, and the like via a communication network 20 illustrated in FIG. 3. The signage device 22 is a device that outputs an image such as advertisements.

The data processing server 31 executes, for example, data processing regarding data received from other devices including the transportation apparatus 10 and the user equipment 21. The data processing server 31 performs processing to provide a result obtained by the processing to each device.

For example, in a case of using a self-driving vehicle as the transportation apparatus 10, the data processing server 31 receives an image captured by a camera of the transportation apparatus 10 or information obtained by a sensor, and performs processing or the like to transmit information used to control a traveling route to the transportation apparatus 10.

Furthermore, for example, it provides and controls information to be displayed on the display unit 11.

The service providing server 32 is, for example, a server that provides various types of information or services, such as news information providing server, weather information providing server, and traffic information providing server.

As illustrated in the figure, the transportation apparatus 10 executes processing or the like of acquiring information regarding the weather forecast from the weather information providing server and of displaying the information on the display unit 11.

The advertisement server 33 is a server that delivers advertisements provided by various companies.

The transportation apparatus 10 acquires information for various advertisements such as advertisements for cars, advertisements for clothing, advertisements for electric appliances, and advertisements for travel information from the advertisement server 33 and displays the information on the display unit 11.

Moreover, the transportation apparatus 10, the user equipment 21, the signage device 22, the data processing server 31, the service providing server 32, and the advertisement server 33 are illustrated one by one in FIG. 3. However, each of them has a configuration in which a number of devices are connected to a network for enabling communication with each other.

[2. Regarding Configuration Example of Information Processing Apparatus]

A specific exemplary configuration of an information processing apparatus 100 mounted on the transportation apparatus 10 is now described with reference to FIG. 4.

Figure 4:
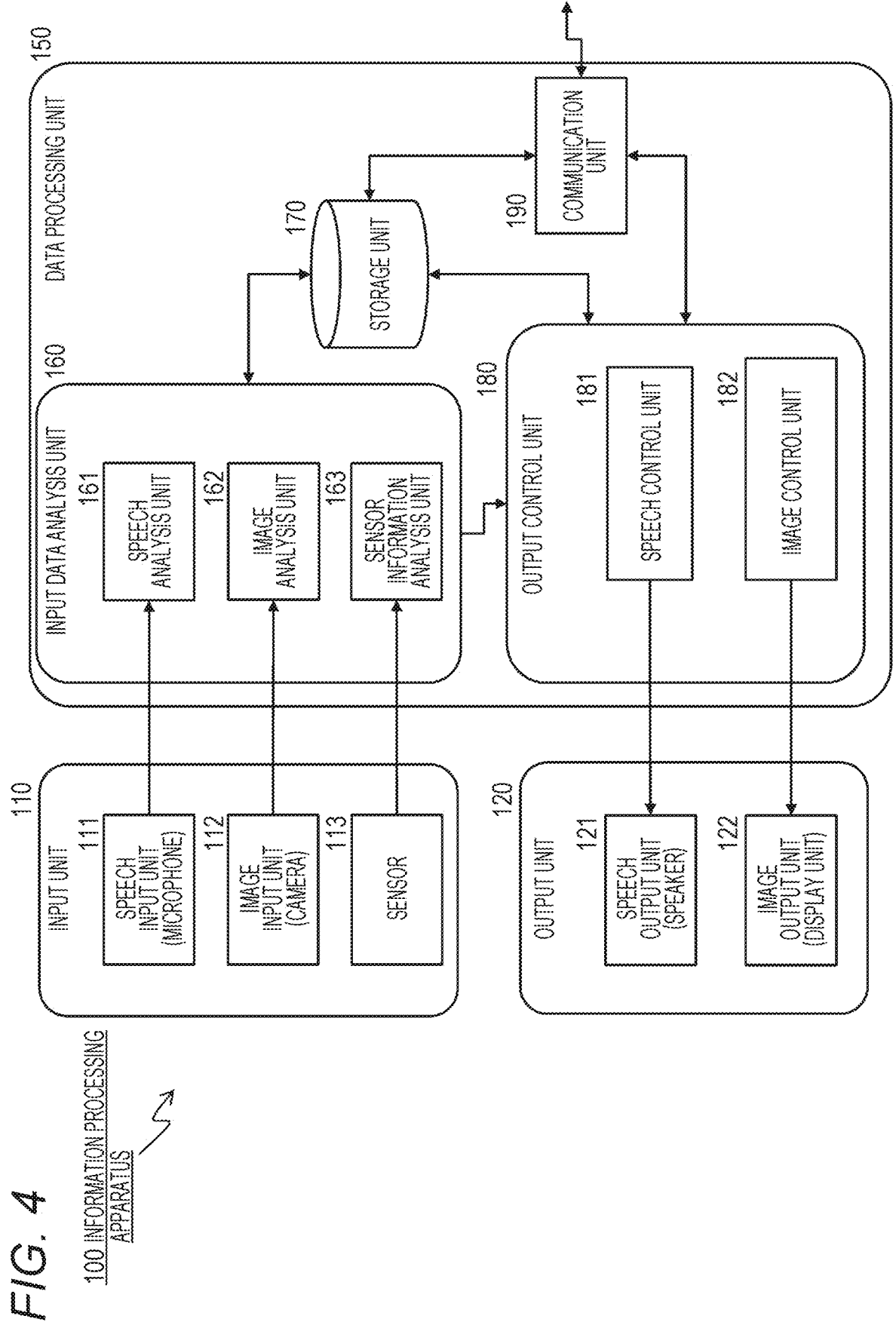
FIG. 4 is a diagram illustrated to describe an exemplary configuration of an information processing apparatus.

FIG. 4 is a diagram illustrating an exemplary configuration of the information processing apparatus 100 mounted on the transportation apparatus 10.

As illustrated in FIG. 4, the information processing apparatus 100 includes an input unit 110, an output unit 120, and a data processing unit 150.

Moreover, the data processing unit 150 is capable of being implemented in the information processing apparatus 100 mounted on the transportation apparatus 10. However, the data processing unit 150 may not be necessarily provided in the information processing apparatus 100 of the transportation apparatus 10. In this case, a data processing unit of an external server can be used instead. In the case of a configuration using the server, the information processing apparatus 100 transmits input data that is input through the input unit 110 to the server via a network, receives a result processed in the data processing unit 150 of the server, and output it through the output unit 120.

The components of the information processing apparatus 10 illustrated in FIG. 4 are now described.

The input unit 110 includes a speech input unit (microphone) 111, an image input unit (camera) 112, and a sensor 113.

The output unit 120 includes a speech output unit (speaker) 121 and an image output unit (display unit) 122.

The information processing apparatus 100 of the transportation apparatus 10 has at least these components.

Moreover, the image output unit (display unit) 122 includes, for example, a plurality of display units installed in the left and right sides and the front and rear sides of the transportation apparatus 10 as described with reference to FIGS. 1 and 2 and further installed inside the transportation apparatus 10.

The data processing unit 150 is configured as a component to be implemented in either the information processing apparatus 100 of the transportation apparatus 10 as described above or a server capable of communicating with the information processing apparatus 100 of the transportation apparatus 10.

The data processing unit 150 has an input data analysis unit 160, a storage unit 170, an output control unit 180, and a communication unit 190.

The input data analysis unit 160 has a speech analysis unit 161, an image analysis unit 162, and a sensor information analysis unit 163.

The output control unit 180 has a speech control unit 181 and an image control unit 182.

The speech input unit (microphone) 111 acquires speech outside the transportation apparatus 10, for example, a voice of a user such as pedestrians or the like, and inputs the acquired speech to the speech analysis unit 161.

The speech analysis unit 161 analyzes the speech of the user 50 or the like, stores the analyzed result in the storage unit 170, and outputs the analyzed result to the output control unit 180.

The image input unit (camera) 112 captures an image around the transportation apparatus 10 and inputs the captured image to the image analysis unit 162.

The image input unit (camera) 112 inputs an image of the entire periphery of the left, right, front, and rear sides of the transportation apparatus 10.

The image analysis unit 162 analyzes the surrounding image of the transportation apparatus 10. For example, the image analysis unit 162 analyzes the position of the user such as a pedestrian, the behavior of the user, or the like, stores a result obtained by the analysis in the storage unit 170, and outputs it to the output control unit 180.

The sensor 113 is, for example, a position sensor, an environmental sensor, a sensor that acquires control state information of the transportation apparatus 10 such as the speed and acceleration or the opening and closing of the door of the transportation apparatus 10, or the like. The position sensor indicates the position of the transportation apparatus 10. The environmental sensor indicates an external environment, specifically, temperature, humidity, barometric pressure and the like.

The sensor information analysis unit 163 generates analysis information based on information acquired by the sensor, stores the analyzed result in the storage unit 170, and outputs it to the output control unit 180.

Moreover, the speech input unit (microphone) 111 and the image input unit (camera) 112 are also a type of sensors. Thus, the speech input unit (microphone) 111, the image input unit (camera) 112, and the sensor 113 are collectively referred to as a sensor in some cases.

The storage unit 170 stores information (utterance contents) regarding the speech of the user such as a pedestrian, which is analyzed by the speech analysis unit 161, the result obtained from an image around the transportation apparatus 10 analyzed by the image analysis unit 162, or the analyzed result obtained by the sensor information analysis unit 163. The analyzed result obtained from an image around the transportation apparatus 10 includes, for example, information regarding the position of the user, such as a pedestrian, the behavior of the user, or the like. The analyzed result obtained by the sensor information analysis unit 163 includes, for example, the position of the transportation apparatus 10, an external environment, control information of the transportation apparatus 10, or the like.

The storage unit 170 further stores route information used to decide a traveling route of the transportation apparatus 10 and speech data or image data that is output under the control of the output control unit 180. For example, speech data or image data, which constitutes advertising information or guide information, is stored.

The output control unit 180 has a speech control unit 181 and an image control unit 182.

The speech control unit 181 controls speech that is output through the speech output unit (speaker) 121 installed in the transportation apparatus 10.

The speech that is output through the speech output unit (speaker) 121 is various types of information such as various types of guidance, guide information, information including news, advertising information, and even music, for example.

The image control unit 182 controls the output of image data to be output to the image output unit (display unit) 122.

Moreover, the image output unit (display unit) 122 includes a plurality of display units installed in the left and right sides and the front and rear sides of the transportation apparatus 10 as described with reference to FIGS. 1 and 2 and further installed inside the transportation apparatus 10. The image control unit 182 controls the output of image data to be output to the plurality of display units.

The communication unit 190 executes communication with various external devices.

For example, as described with reference to FIG. 3 above, the communication unit 190 executes communication with various cloud-side devices including user equipment 21, a signage device 22, a data processing server 31, a service providing server 32, an advertisement server 33, and the like via a communication network 20. The signage device 22 is a device that outputs an image such as advertisements.

In the output control unit 180, the speech control unit 181 and the image control unit 182 execute control of generation or updating processing or the like on the information to be output to the speech output unit (speaker) 121 and the image output unit (display unit) 122, respectively. In this case, the analysis information of the input data analysis unit 160, the speech data or image data stored in the storage unit 170, information obtained via the communication unit 190, or the like is used.

[3. Specific Processing Example Executed by Information Processing Apparatus]

A specific processing example executed by the information processing apparatus is now described.

The following processing steps are described sequentially.

(1) Example of cooperation processing among transportation apparatus, user equipment, and signage device (2) Processing to control display image corresponding to traveling state of transportation apparatus (3) Processing to display AR image using real object behind transportation apparatus (4) Processing to display character or image corresponding to position of transportation apparatus (5) Processing to display image corresponding to line-of-sight direction of user looking at display unit (6) Processing to display advertisement image linked to shops around transportation apparatus (7) Processing to provide service corresponding to action of user looking at display unit of transportation apparatus (8) Other image display examples

[3-(1). Example of Cooperation Processing Among Transportation Apparatus, User Equipment, and Signage Device]

First, an example of cooperation processing among a transportation apparatus, a user equipment, and a signage device is now described.

Figure 5:
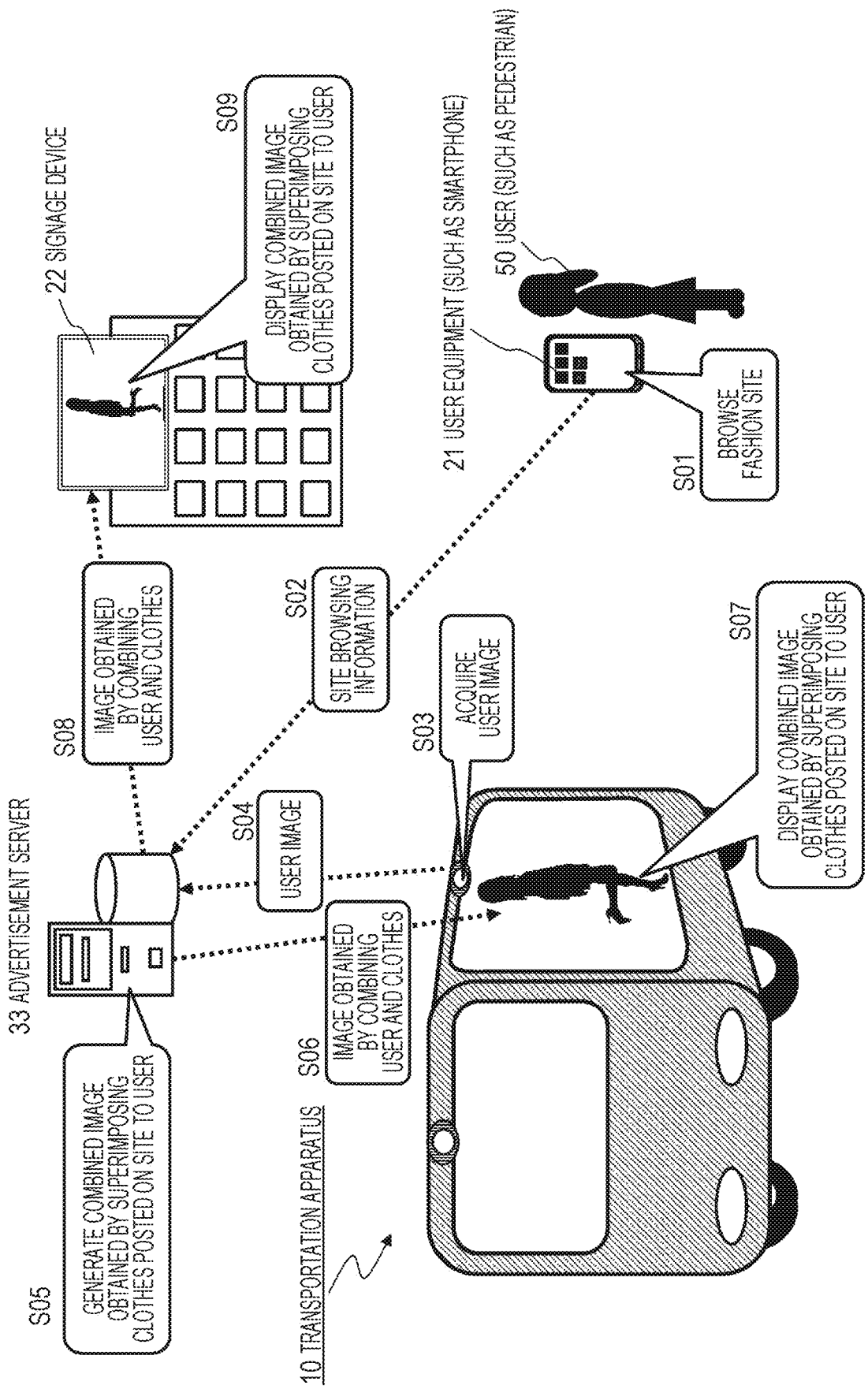
FIG. 5 is a diagram illustrated to describe a processing example executed by a transportation apparatus or an information processing apparatus.

FIG. 5 is a diagram illustrating an example of the advertisement providing processing in which the user equipment 21, the transportation apparatus 10, and the signage device 22 cooperate.

This advertisement providing processing is an example of user-adaptive advertisement providing processing that provides an optimal advertisement depending on the taste of a user (such as pedestrian) 50 in front of the transportation apparatus 10.

For example, the processing is executed in the order of steps S01 to S09 illustrated in FIG. 5.

The processing steps are now described sequentially.

(Step S01)

The user 50 such as a pedestrian in front of the display unit of the transportation apparatus 10 first browses a product (clothes) of a certain clothing brand on a website operated by the brand that is displayed on the user equipment 21 such as a smartphone.

(Step S02)

In step S02, the advertisement server 33 acquires website browsing information of a website browsed by the user 50.

(Steps S03 to S04)

Step S03 is a processing step of capturing an image of the user 50 that is performed by the camera of the transportation apparatus 10.

The image input unit (camera) 112 of the transportation apparatus 10 captures an image of the user 50 who is browsing the website displayed on the user equipment 21 such as a smartphone in front of the transportation apparatus 10.

Furthermore, in step S04, the captured image is transmitted to the advertisement server 33.

(Step S05)

The advertisement server 33 executes the processing of step S05.

The advertisement server 33 combines the image of the user 50 with an image of the clothes and generates a combined image of a state where the clothes of a brand the user is viewing is superimposed on the user 50.

In other words, the advertisement server 33 executes the following processing steps (a) to (c).

(a) Specifying a piece of clothing that the user 50 is viewing and acquiring an image of the clothes from the storage unit of the advertisement server 33 on the basis of the website browsing information acquired from the user equipment 21 in step S02.

(b) Further acquiring the image of the user 50 acquired from the transportation apparatus 10 in step S04.

(c) Lastly, the advertisement server 33 combines the image of the user 50 with an image of the clothes and generates a combined image of a state where the clothes of a brand the user is viewing is superimposed on the user 50.

(Steps S06 to S07)

The advertisement server 33 transmits the generated combined image to the transportation apparatus 10 in step S06.

The image control unit 182 of the information processing apparatus 100 in the transportation apparatus 10 outputs the combined image acquired from the advertisement server 33 to the image output unit (display unit) 122.

The user 50 confirms the image in which the user is displayed on the display unit of the transportation apparatus 10 in front of the user.

The displayed image is the image in which the clothes of the user's favorite brand of the website that the user 50 is now displaying on the user equipment 21 and viewing is superimposed on the user 50.

Such a display allows the user 50 to further increase the interest in the clothes, resulting in achieving a great advertisement effect.

(Steps S08 to S09)

The advertisement server 33 transmits the combined image of the state where the brand clothes is superimposed on the user not only to the transportation apparatus 10 but also to the signage device 22, for example, provided on a wall surface of a building or the like.

The signage device 22 outputs the combined image acquired from the advertisement server 33.

Moreover, an image on the signage device 22 can be controlled, for example, to be displayed on the signage device 22 at a location visible from the window of the transportation apparatus 10 the user rides on.

Such processing makes it possible for the user 50 to view the user's own appearance displayed on the signage device in various places as the user moves.

As described above, it is possible to generate a combined image obtained by combining the user's own image with a product such as clothing of a brand that the user is interested in and to present the combined image to the transportation apparatus 10 or other signage devices in the town. This makes it possible to increase the user's interest in the product and increase the advertising effect.

Moreover, the processing of generating and displaying the combined image as described above is preferably executed on condition that, for example, the permission of a fact that there is a possibility that the user's image is used as an advertisement is obtained when the user 50 downloads a particular application to the user equipment 21.

In addition, it is possible to have a configuration in which a service such as a reward such as providing a coupon including, for example, a discount coupon or a complimentary ticket to the user 50 is provided upon using the advertisement.

In the processing example described with reference to FIG. 5, the description is given of the exemplary configuration in which the advertisement server 33 executes the generation of the combined image. However, it is possible to have a configuration in which the information processing apparatus in the transportation apparatus 10 generates the combined image.

The combined image is generated using the clothing image information stored in the storage unit of the information processing apparatus in the transportation apparatus 10.

Alternatively, it is possible to have a configuration in which only the clothing image information is acquired from the advertisement server 33.

[3-(2). Processing to Control Display Image Corresponding to Traveling State of Transportation Apparatus]

An example of the processing of controlling a display image depending on the traveling state of the transportation apparatus is now described.

Figure 6:
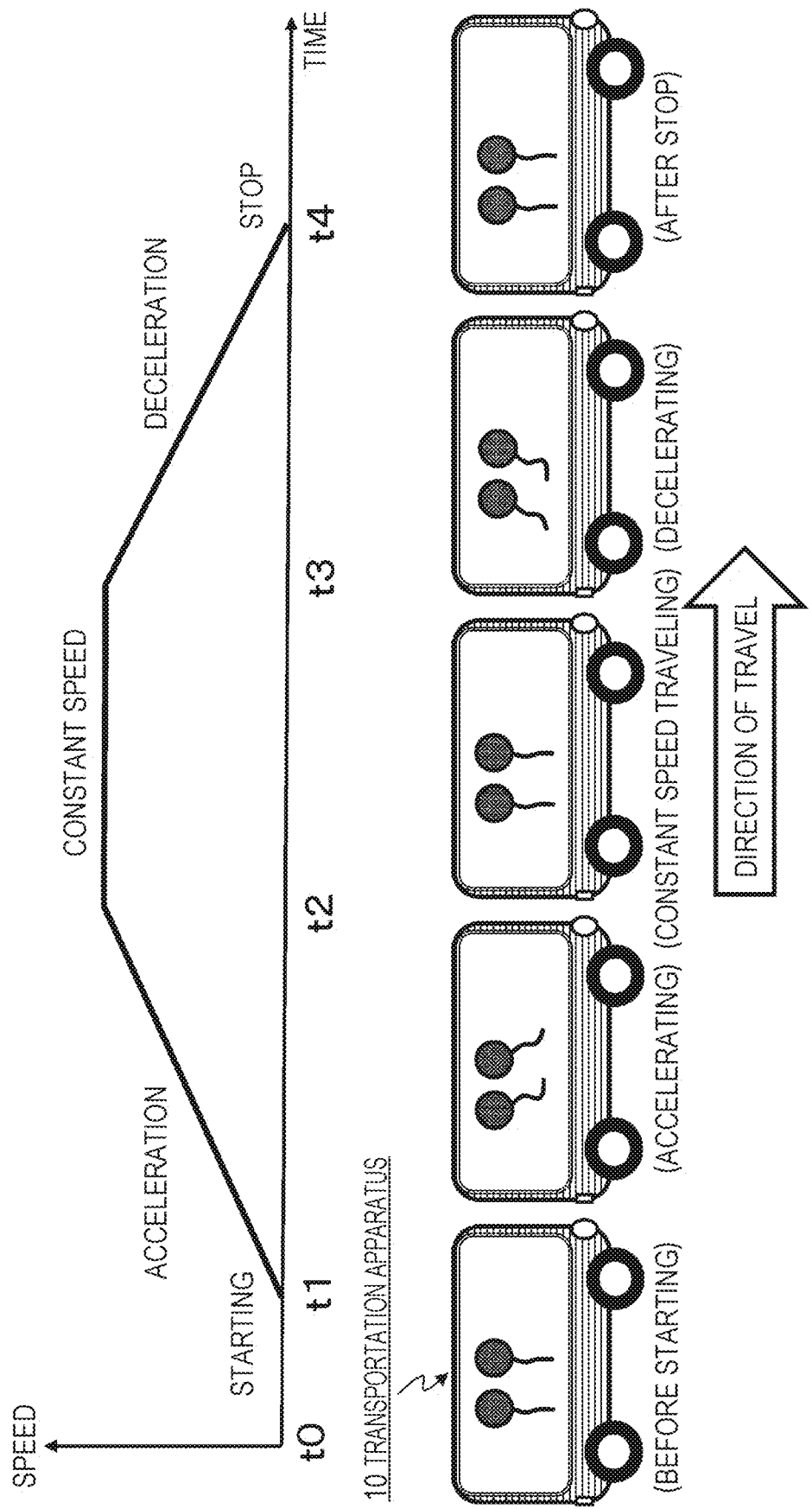
FIG. 6 is a diagram illustrated to describe a processing example executed by a transportation apparatus or an information processing apparatus.

With reference to FIG. 6, a description is given of an example of the processing of controlling a display image on the image output unit (display unit) 122 depending on the traveling state of the transportation apparatus 10.

This control of the display image is executed by the image control unit 182 of the output control unit 180.

The transportation apparatus 10 moves from left to right as illustrated in FIG. 6.

The transportation apparatus 10 makes a transition among these five different states of before starting, accelerating, constant speed traveling, decelerating, and after stop.

The image control unit 182 of the output control unit 180 controls the display image on the image output unit (display unit) 122 depending on the traveling state of the transportation apparatus 10.

As illustrated in FIG. 6, the image output unit (display unit) 122 of the transportation apparatus 10 displays an image in which a balloon having one end of a string fixed at a predetermined position is floating.

This image is updated depending on the traveling state of the transportation apparatus 10 sequentially as follows:

(1) Before starting from time t0 to t1, the balloon is displayed in a substantially vertical state (ascending).

(2) During accelerating from time t1 to t2, the balloon is displayed as if it were flying behind the transportation apparatus 10.

(3) During constant speed traveling from time t2 to t3, the balloon is again displayed in a substantially vertical state (ascending).

(4) During decelerating from time t3 to t4, the balloon is displayed as if it were flying toward in front of the transportation apparatus 10.

(5) After stop after time t4, the balloon is again displayed in a substantially vertical state (ascending).

Moreover, the sensor information analysis unit 163 analyzes each state of the transportation apparatus 10, that is, before starting, accelerating, constant speed traveling, decelerating, and after stop, on the basis of the transportation apparatus control information acquired by the sensor 113.

The image control unit 182 controls the image display as illustrated in FIG. 6 on the basis of the information analyzed by the sensor information analysis unit 163.

Moreover, in the example illustrated in FIG. 6, the example is described in which a balloon is used as an image. However, for example, the display control to generate a movement similar to the movement of a balloon can be performed for other images or characters.

In addition, in the example using the balloon illustrated in FIG. 6, the example is shown in which the position of the balloon is fixed substantially at the center of the screen. However, the position of the balloon can vary sequentially, specifically, the balloon can move to flow on the screen, for example.

In addition, upon accelerating or decelerating, a motion can occur such that a plurality of objects collides.

As illustrated in FIG. 6, the display control performed depending on the traveling state of the transportation apparatus 10 allows the movement of the balloon to be displayed as a movement corresponding to the movement of the transportation apparatus 10, resulting in attracting the attention of many viewing users such as pedestrians.

[3-(3). Processing to Display AR Image Using Real Object Behind Transportation Apparatus]

Next, an example of processing to display AR image using real object behind transportation apparatus is now described.

An example of processing of displaying an augmented reality image (AR image) using the real object located behind the transportation apparatus 10 on the image output unit (display unit) 122 is described with reference to FIG. 7.

This control of the display image is executed by the image control unit 182 of the output control unit 180.

Figure 7:
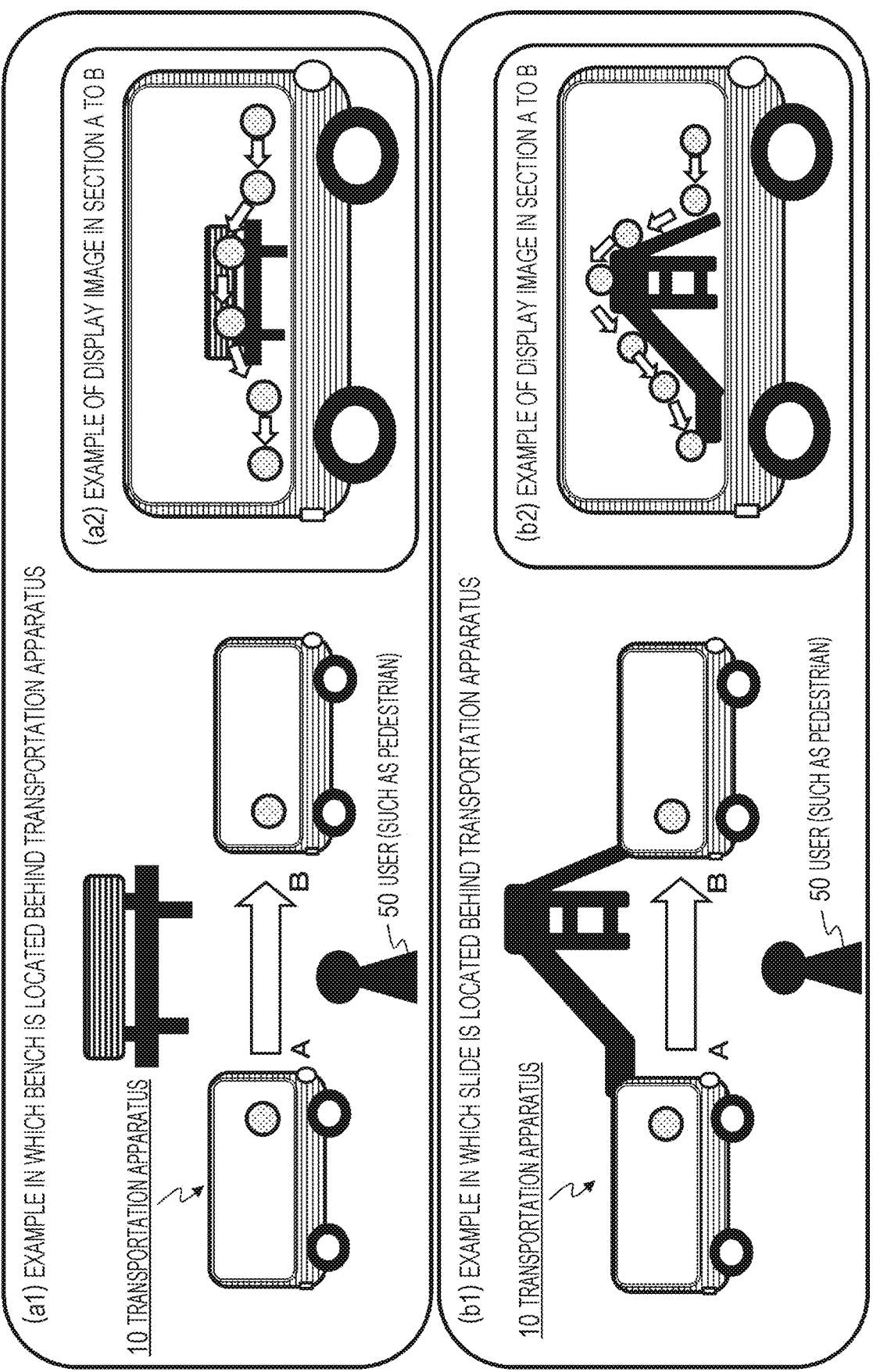
FIG. 7 is a diagram illustrated to describe a processing example executed by a transportation apparatus or an information processing apparatus.

FIG. 7 illustrates an example of displaying two AR images as follows:

(a1) Example in which a bench is located behind the transportation apparatus 10

(b1) Example in which a slide is located behind the transportation apparatus 10

The user 50 such as a pedestrian looks at the display unit on the side surface of the transportation apparatus 10, and there is a bench or a slide behind the direction in which the transportation apparatus 10 passes.

The description is now given of the display control example of the case (a1) Example in which a bench is located behind the transportation apparatus 10.

The camera of the transportation apparatus 10 captures an image behind the direction in which the transportation apparatus 10 passes. In this image, a bench that is a real object is captured.

The image control unit 182 generates an AR image obtained by combining an animation image with the real image including the bench and outputs the generated AR image to the image output unit (display unit) 122.

An image when the transportation apparatus 10 passes through sections A to B indicated in the part (a1) of FIG. 7 is illustrated in the part (a2) of FIG. 7.

When the transportation apparatus 10 passes through the sections A to B, the image shifts in such a manner that the image of the ball that is an animation image goes up to the bench that is the real image and then goes down from the bench, as illustrated in the part (a2) of FIG. 7.

The image control unit 182 generates such an AR image and outputs it to the image output unit (display unit) 122.

Next, the description is given of the display control example of the case (b1) Example in which a slide is located behind the transportation apparatus 10.

The camera of the transportation apparatus 10 captures an image behind the direction in which the transportation apparatus 10 passes. In this image, a slide that is a real object is captured.

The image control unit 182 generates an AR image obtained by combining an animation image with the real image including the slide and outputs the generated AR image to the image output unit (display unit) 122.

An image when the transportation apparatus 10 passes through sections A to B indicated in the part (b1) of FIG. 7 is illustrated in the part (b2) of FIG. 7.

When the transportation apparatus 10 passes through the sections A to B, the image shifts in such a manner that the image of the ball that is an animation image goes up to the slide that is the real image and then slide down from the slide, as illustrated in the part (b2) of FIG. 7.

The image control unit 182 generates such an AR image and outputs it to the image output unit (display unit) 122.

Moreover, the example in which a ball is used as an animation image is described in FIG. 7, but it is possible to use various other animation images such as text, character images, and vehicles.

In addition, it is possible to display the movement of the animation image in various manners, for example, bouncing a ball or changing its speed.

The generation and displaying of the AR image as illustrated in FIG. 7 allow the combined image of the real object and the animation image to be displayed on the display unit of the transportation apparatus 10, resulting in attracting the attention of many viewing users such as pedestrians.

[3-(4). Processing to Display Character or Image Corresponding to Position of Transportation Apparatus]

An example of processing of displaying a character or an image depending on the position of the transportation apparatus is now described.

Figure 8:
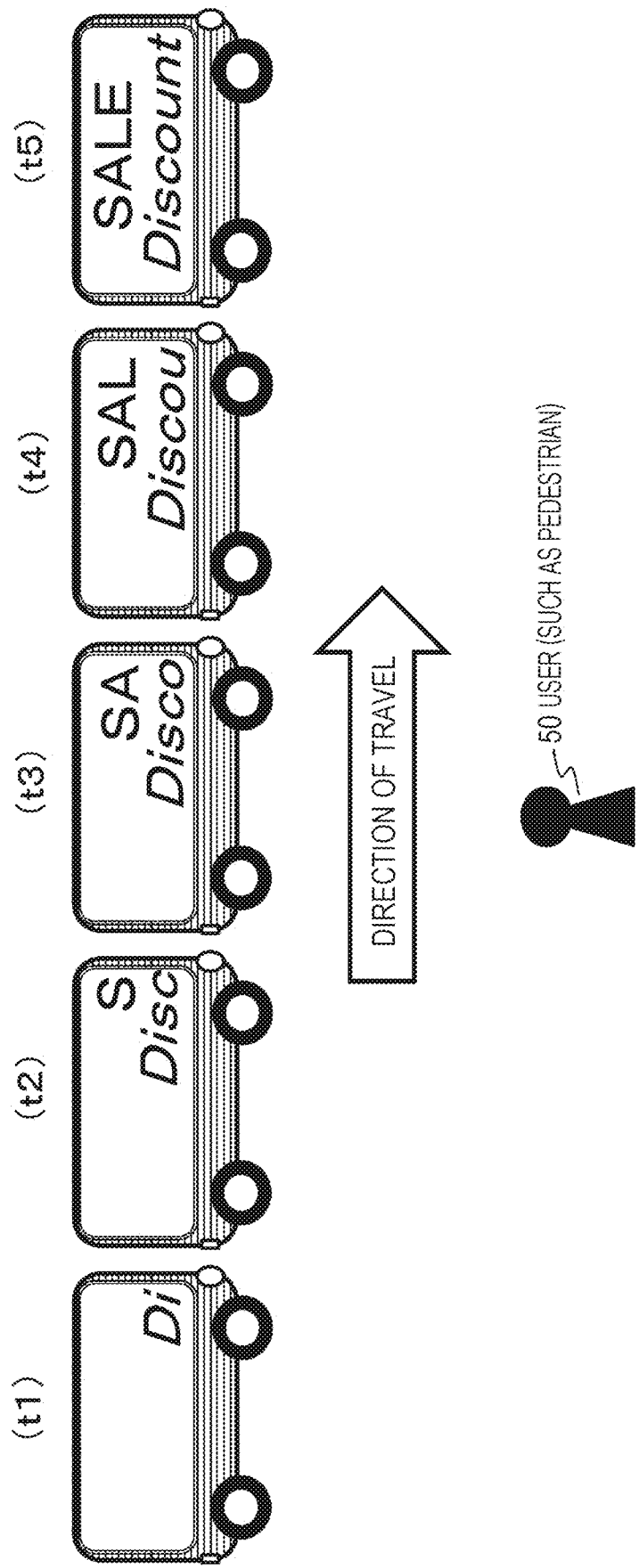
FIG. 8 is a diagram illustrated to describe a processing example executed by a transportation apparatus or an information processing apparatus.

With reference to FIG. 8, a description is given of an example of processing of displaying a character or an image depending on the position of the transportation apparatus 10 on the image output unit (display unit) 122.

This control of the display image is executed by the image control unit 182 of the output control unit 180.

The transportation apparatus 10 moves from left to right in front of the user 50 such as a pedestrian as illustrated in FIG. 8.

In this case, the characters are displayed on the display unit on the side surface of the transportation apparatus 10 to scroll from right to left with the movement of the transportation apparatus 10 as illustrated in the figure.

In the example illustrated in the figure, two words of
"SALE" and
"Discount"
are set to be displayed sequentially from the first character with the movement of the transportation apparatus 10.

At time (t1), only "Di" of "Discount" is displayed on the right end of the display unit.

At time (t2), only "Disc" of "Discount" and "S" of "SALE" are displayed on the display unit.

At time (t3), only "Disco" of "Discount" and "SA" of "SALE" are displayed on the display unit.

At time (t4), only "Discou" of "Discount" and "SAL" of "SALE" are displayed on the display unit.

At time (t5), only "Discount" of "Discount" and "SALE" of "SALE" are displayed on the display unit.

Moreover, although FIG. 8 illustrates the example in which characters are displayed, various display data such as images and animations other than characters can be similarly displayed in such a way to be scrolled from the front to the rear of the transportation apparatus 10.

Moreover, it is possible to have a configuration in which the image control unit 182 of the output control unit 180 executes the display image control as described above using an image stored in a storage unit 170 in advance executes it on the basis of a position of the transportation apparatus 10 that is analyzed on the basis of input information from the sensor 113.

As illustrated in FIG. 8, displaying an image corresponding to the position of the transportation apparatus 10 makes it possible to attract the attention of many viewing users such as pedestrians.

[3-(5). Processing to Display Image Corresponding to Line-of-Sight Direction of User Looking at Display Unit]

Next, an example of processing to display an image corresponding to a line-of-sight direction of the user looking at the display unit is now described.

Figure 9:
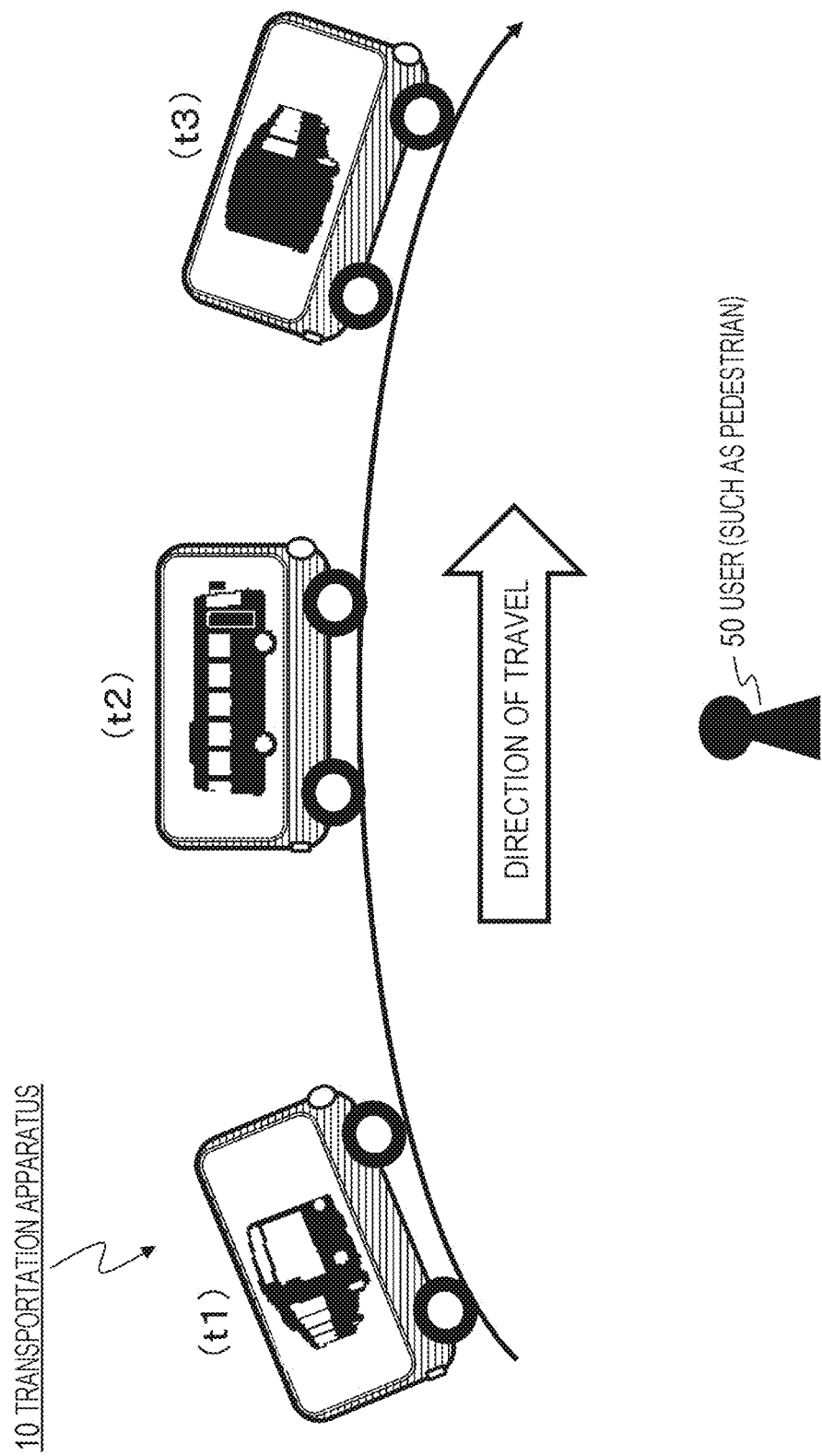
FIG. 9 is a diagram illustrated to describe a processing example executed by a transportation apparatus or an information processing apparatus.

With reference to FIG. 9, a description is given of an example of processing of displaying an image corresponding to the line-of-sight direction of the user who is looking at the display unit of the transportation apparatus 10.

This control of the display image is executed by the image control unit 182 of the output control unit 180.

The transportation apparatus 10 moves from left to right in front of the user 50 such as a pedestrian as illustrated in FIG. 9.

In this case, the image is displayed on the display unit on the side surface of the transportation apparatus 10 to correspond the line-of-sight direction of the user 50 who is looking at the display unit as illustrated in the figure.

In the example illustrated in the figure, the example is shown in which an image of a bus is displayed as an image corresponding to the line-of-sight direction of a user looking at the display unit of the transportation apparatus 10.

At time (t1), the display unit of the transportation apparatus 10 displays an image of the front of the bus, which is on the left side of the user 50 and is traveling toward the user who is looking leftward.

At time (t2), the display unit of the transportation apparatus 10 displays an image of the side surface of the bus, which is substantially in front of the user 50 and is traveling in a direction parallel to the user who is looking in the front direction.

At time (t3), the display unit of the transportation apparatus 10 displays an image of the rear face of the bus, which is on the right side of the user 50 and is traveling away from the user who is looking rightward.

Thus, an image corresponding to line-of-sight direction of user looking at display unit is displayed.

Moreover, it is possible to have a configuration in which the image control unit 182 of the output control unit 180 executes the display image control as described above using an image stored in the storage unit 170 in advance or executes control on the basis of a position of the transportation apparatus 10 that is analyzed on the basis of input information from the sensor 113, or a position information of the user.

Moreover, it is possible to have a configuration in which highlighting using a perspective view based on perspective is further performed on the display mode illustrated in FIG. 9. The front-facing bus with perspective is displayed at time (t1), the horizontal-facing image is displayed at time (t2), and a backward-facing image with perspective is displayed at time (t3).

In addition, in this event, speech information can be added. For example, speech obtained by adjusting a sound field like a wave field synthesis speaker is output. The speech is output together with the display image in response to the determination that the user 50 such as a pedestrian turns the user's eyes on the transportation apparatus 10 on the basis of the captured image of the image input unit (camera) 112 and the acquired information of the sensor 113.

Although a bus is displayed in the example illustrated in FIG. 9, if the bus is replaced with a sports car, in a case where the transportation apparatus 10 is located far from the user 50 such as a pedestrian, the engine sound of the sports car is output from the sound field at the far position. Then, the transportation apparatus 10, when coming closest to the user 50, emits an explosive sound to puff the engine.

As described above, it is possible to have a configuration in which sound having a volume corresponding to the distance between the transportation apparatus 10 and the user is output.

As described with reference to FIG. 9, displaying an image corresponding to line-of-sight direction of user looking at the display unit of the transportation apparatus 10 makes it possible to attract the attention of many viewing users such as pedestrians.

[3-(6). Processing to Display Advertisement Image Linked to Shops Around Transportation Apparatus]

Next, an example of processing to display an advertisement image linked to shops around the transportation apparatus is now described.

Figure 10:
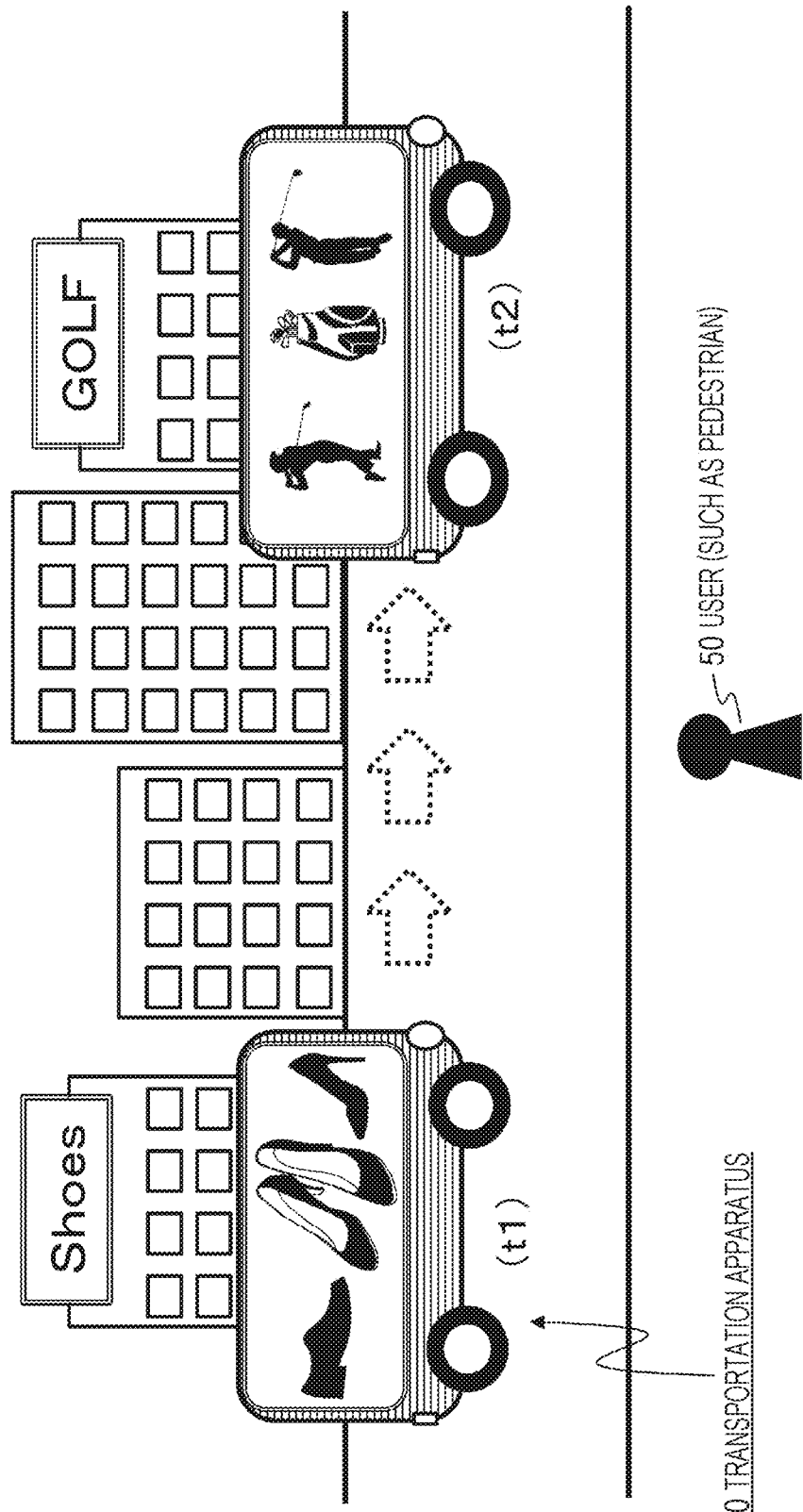
FIG. 10 is a diagram illustrated to describe a processing example executed by a transportation apparatus or an information processing apparatus.

With reference to FIG. 10, a description is given of an example of processing of displaying an advertisement image linked to shops around the transportation apparatus 10.

This control of the display image is executed by the image control unit 182 of the output control unit 180.

The transportation apparatus 10 moves from left to right in front of the user 50 such as a pedestrian as illustrated in FIG. 10.

In this event, the transportation apparatus 10 passes in front of various shops (stores).

At time (t1), it passes in front of a shoe shop, and at time (t2), it passes in front of a golf goods store.

When the transportation apparatus 10 passes in front of the shoe shop at time (t1), an advertisement for a product provided by the shoe shop is displayed on the display unit of the transportation apparatus 10.

In addition, when the transportation apparatus 10 passes in front of the golf goods store at time (t2), an advertisement for a product provided by the golf goods store is displayed on the display unit of the transportation apparatus 10.

Moreover, it is possible to have a configuration in which the image control unit 182 of the output control unit 180 executes such control of the display image using an image stored in the storage unit 170 in advance or outputs information acquired from an external advertisement server.

Moreover, position information of the transportation apparatus 10 analyzed on the basis of input information from the sensor 113 is applied as information on which shop the transportation apparatus 10 is near.

As described with reference to FIG. 10, displaying the advertisement for the shop that the transportation apparatus 10 passes on the display unit on the spot allows, for example, many viewing users such as pedestrians looking at the display unit to remind them to stop by the shop, resulting in increasing advertising effects.

[3-(7). Processing to Provide Service Corresponding to Action of User Looking at Display Unit of Transportation Apparatus]

Next, an example of processing to provide service corresponding to an action of the user looking at a display unit of a transportation apparatus is now described.

Figure 11:
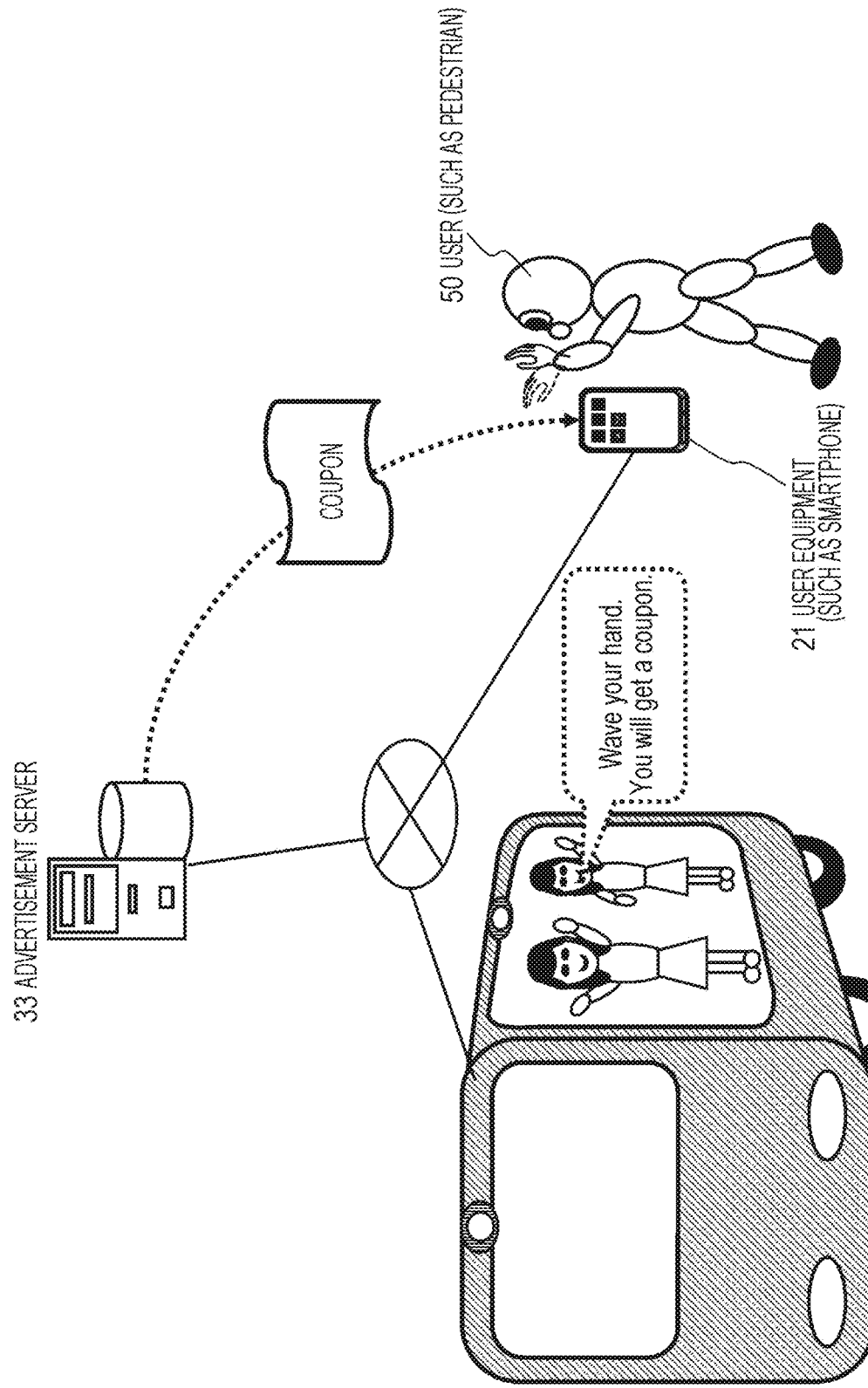
FIG. 11 is a diagram illustrated to describe a processing example executed by a transportation apparatus or an information processing apparatus.

With reference to FIG. 11, a description is given of an example of processing to provide service corresponding to an action of the user who is looking at the display unit of the transportation apparatus 10.

The transportation apparatus 10 moves in front of the user 50 such as a pedestrian as illustrated in FIG. 11.

In this case, the camera of the transportation apparatus 10 is capturing an image of the user 50.

An advertisement image is displayed on the display unit of the transportation apparatus 10, and a character calls out "Wave your hand. You will get a coupon." The speech is output via the speech output unit (speaker) 121.

The image of the user 50 who waves the hand in response to the call is captured by the camera of the transportation apparatus 10 and is transmitted to the advertisement server 33.

The advertisement server 50 transmits a coupon such as a discount ticket or a complimentary ticket to the user equipment 21 of the user.

Moreover, as the processing of specifying a destination for coupon transmission from the advertisement server 33, processing using the correspondence data between the user's face image and the address registered in the storage unit of the advertisement server 33 in advance, or the like can be performed.

Alternatively, it is possible to perform processing such as displaying a website address or QR code (registered trademark) for accessing the website on the display unit of the transportation apparatus 10 and allowing the user to access the website using such information to obtain a coupon.

[3-(8). Other Image Display Examples]

A description is given of an example of controlling other display images executed by the image control unit 182 in the output control unit 180 of the information processing apparatus 100.

Figure 12:
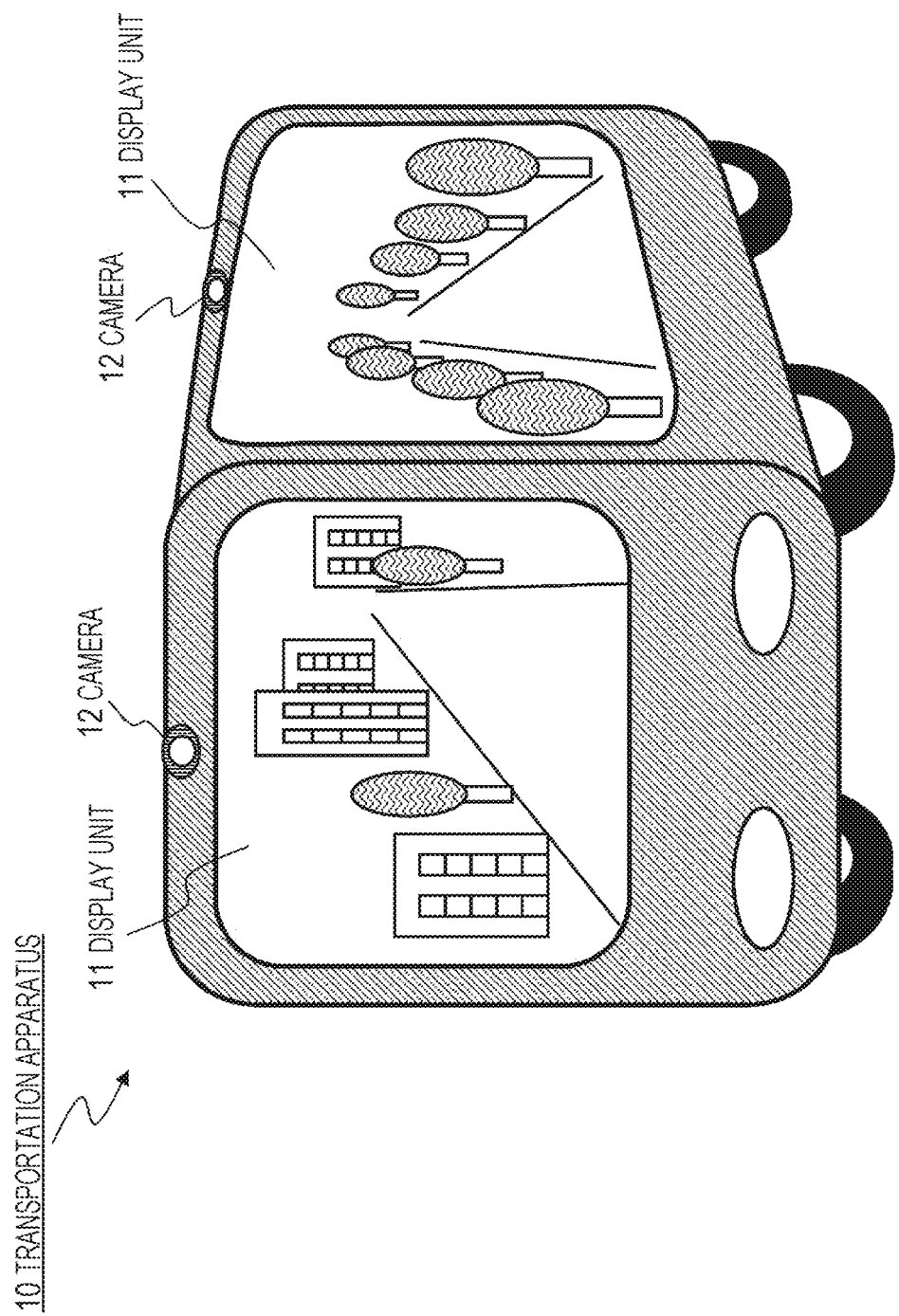
FIG. 12 is a diagram illustrated to describe a processing example executed by a transportation apparatus or an information processing apparatus.

FIG. 12 illustrates an image having a sense of depth on the display unit on each of the front, rear, left, and right sides of the transportation apparatus 10. For example, an image having a sense of depth is displayed by setting the farthest point as a vanishing point substantially at the center of each display screen.

In a case where an image having such a sense of depth is displayed, the image control unit 182 acquires the position of the user who is looking at the image on each display screen from the image captured by the camera. The image control unit 182 performs control to change the image in such a way that the line-of-sight direction of the user is the farthest point (vanishing point).

Figure 13:
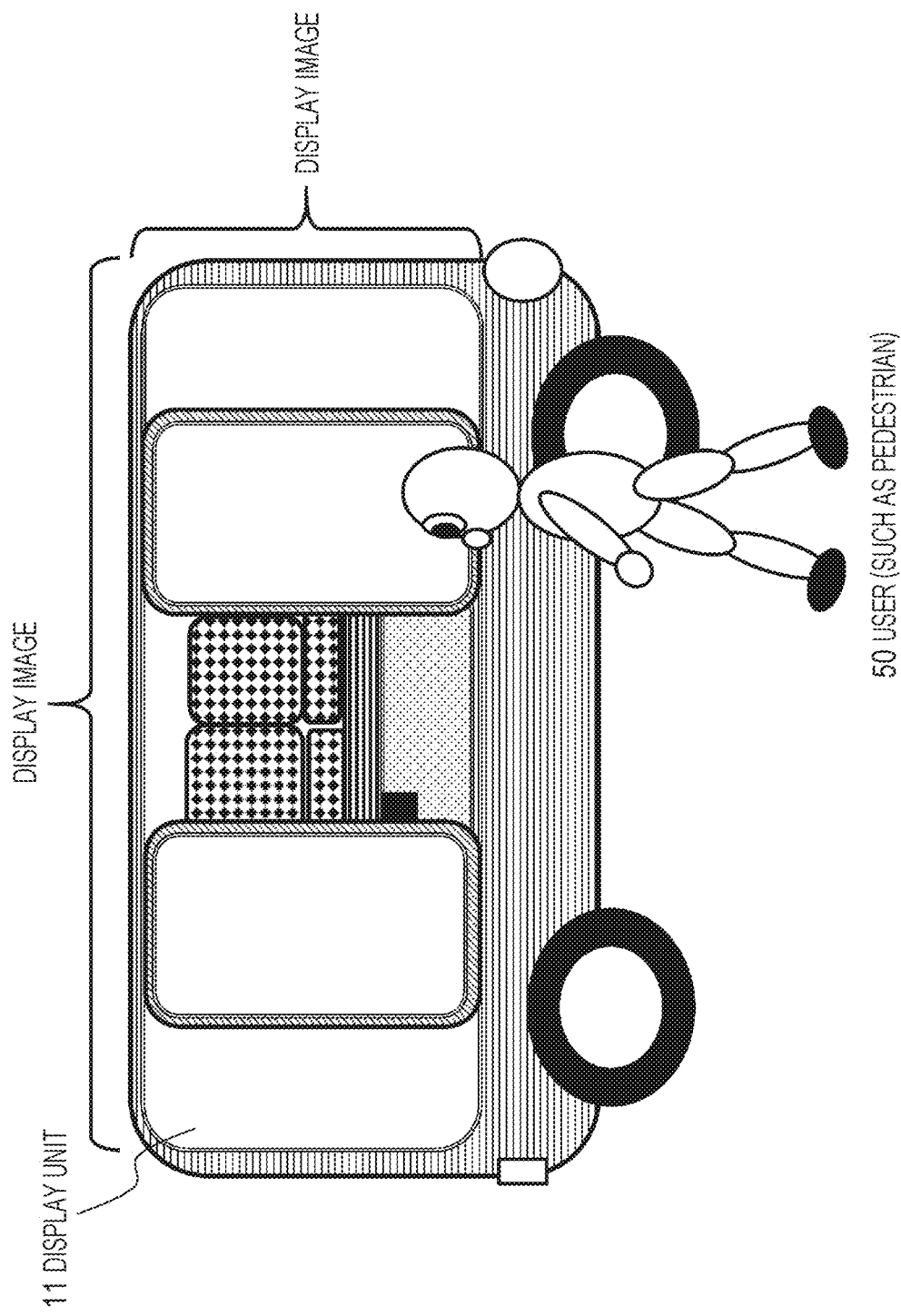
FIG. 13 is a diagram illustrated to describe a processing example executed by a transportation apparatus or an information processing apparatus.

FIG. 13 illustrates that, in a case where the user 50 such as a pedestrian is detected near the transportation apparatus 10, an image is displayed on the display unit on the side of the user as if the bus door were open.

Displaying such an image allows the user 50 to pay attention to the transportation apparatus 10.

For example, it is possible to increase the degree of attention to the advertisement by switching images and displaying advertisements later.

Moreover, although a plurality of embodiments is described, it is possible to execute these embodiments individually or to execute any plurality of embodiments in combination.

[4. Example of Hardware Configuration of Information Processing Apparatus and Information Processing System]

Although the processing executed by the transportation apparatus 10 of the present disclosure is described above, the processing function of each component of the information processing apparatus 100 illustrated in FIG. 4 as described above with reference to FIG. 4 can be implemented in the information processing apparatus in the transportation apparatus 10. In addition, it is also possible to implement a configuration in which some of the processing functions are executed in a server or the like.

Figure 14:
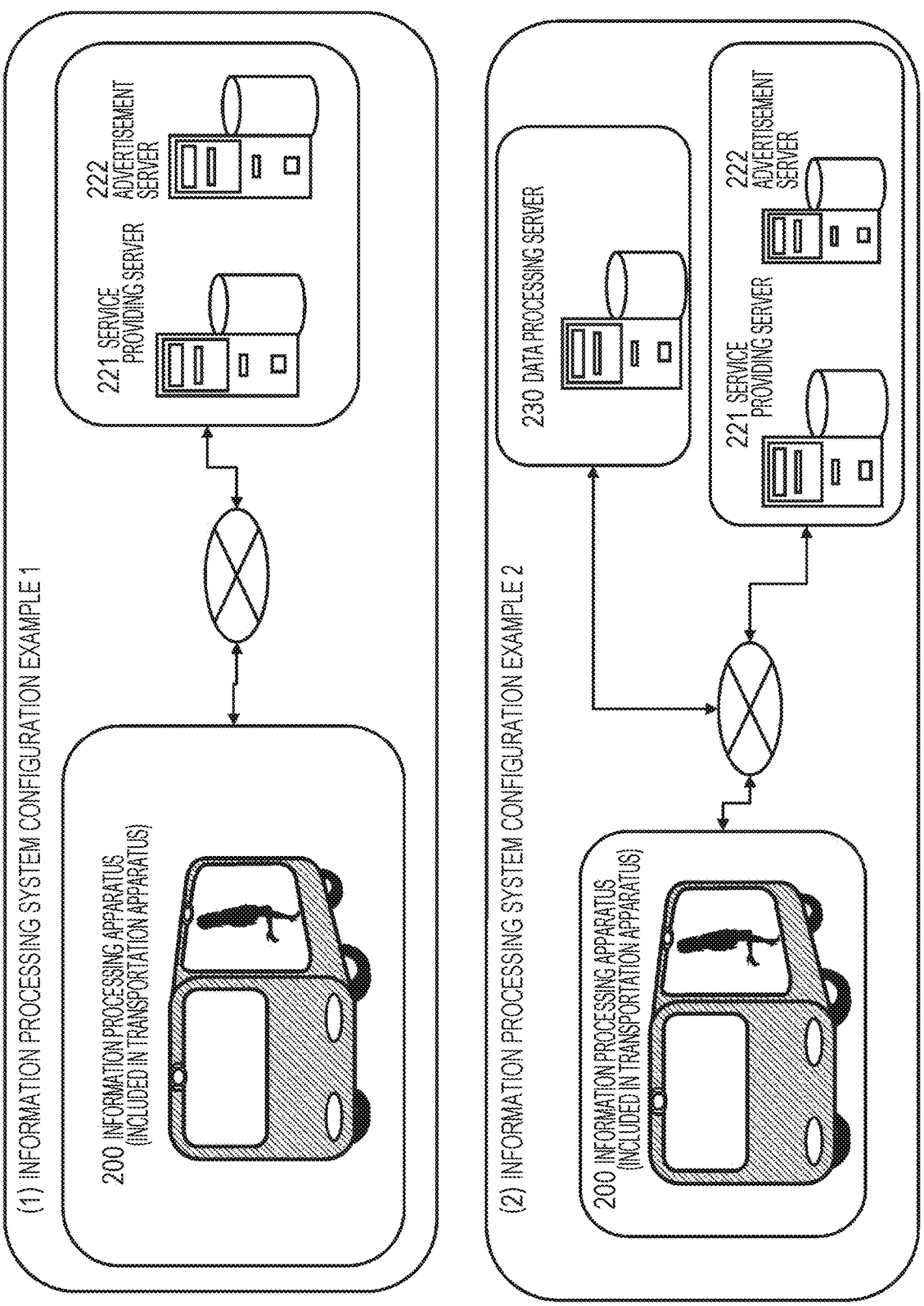
FIG. 14 is a diagram illustrated to describe a configuration example of an information processing system.

FIG. 14 illustrates an example of the system configuration.

The part (1) Information processing system configuration example 1 in FIG. 14 is an example in which substantially all the functions of the information processing apparatus illustrated in FIG. 4 are implemented in an information processing apparatus 200 in the transportation apparatus 10.

The information processing apparatus 200 in the transportation apparatus 10 acquires information from an external server in a case of acquiring data or the like to be displayed on the display unit.

For example, the information is obtained from a service providing server 221 configured to provide guide information, weather information, or news information, or an advertisement server 222 configured to provide advertising information.

The generation, control, or the like of the output information to which the acquired information is applied is executed in the information processing apparatus 200 in the transportation apparatus 10.

On the other hand, the part (2) Information processing system configuration example 2 in FIG. 14 is a system example. In this system example, some of the functions of the information processing apparatus illustrated in FIG. 4 are implemented in the information processing apparatus 200 in the transportation apparatus 10, and others are executed in a data processing server 230 capable of communicating with the information processing apparatus 200.

For example, it is possible to have a configuration in which only the input unit 110 and the output unit 120 in the apparatus illustrated in FIG. 4 are incorporated into the information processing apparatus 200 in the transportation apparatus 10 and all other functions are executed on the side of the server.

Moreover, it is possible to have a configuration in which the functions on the side of the information processing apparatus 200 in the transportation apparatus 10 and the functions on the side of the server can be distributed into various different settings or one function is executed by both sides.

[5. Example of Hardware Configuration of Information Processing Apparatus]

An example of a hardware configuration of the information processing apparatus is now described with reference to FIG. 15.

Figure 15:
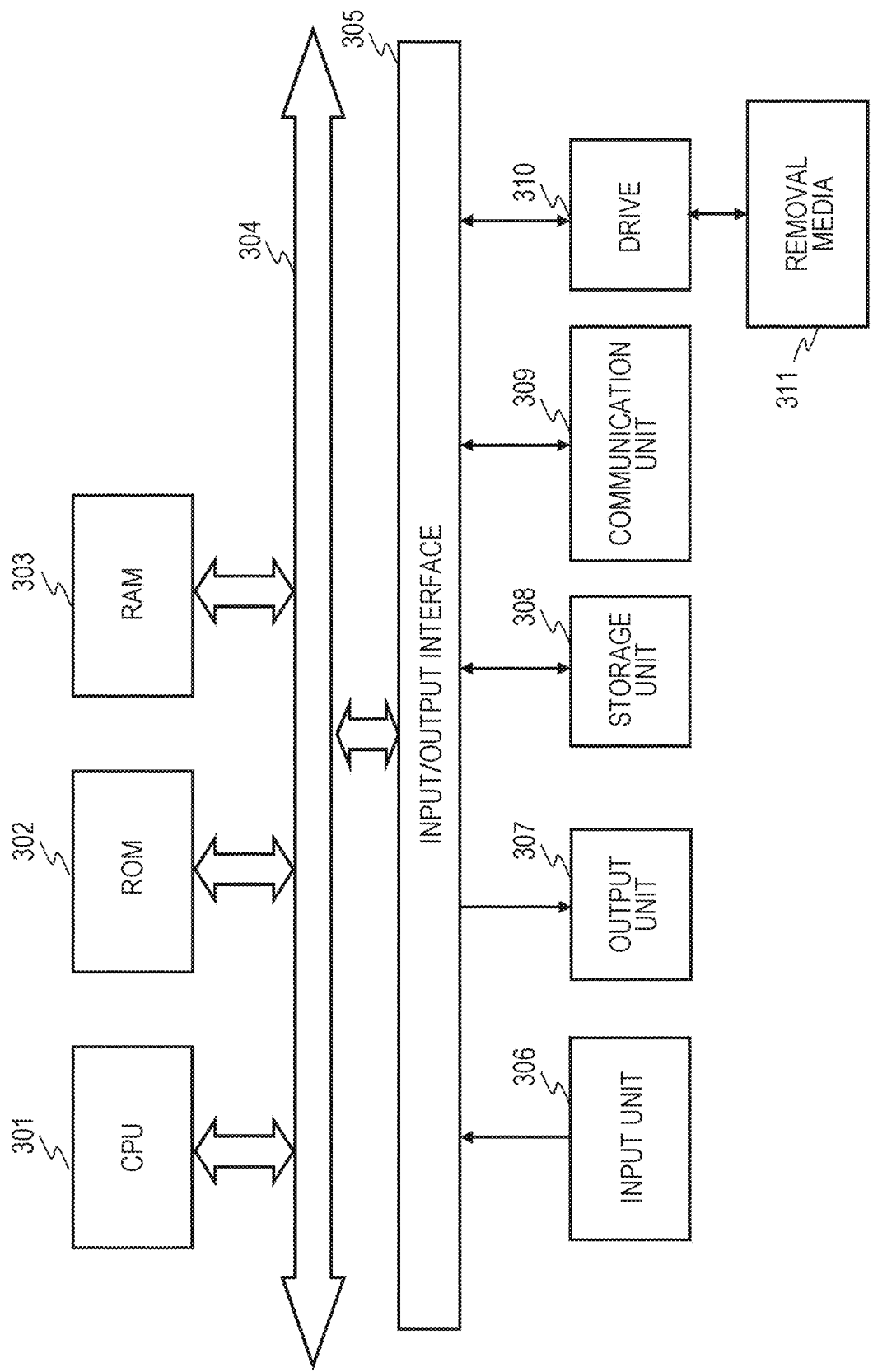
FIG. 15 is a diagram illustrated to describe an example of a hardware configuration of the information processing apparatus.

The hardware described with reference to FIG. 15 is an example of the hardware configuration of the information processing apparatus described above with reference to FIG. 4, and an example of the hardware configuration of the user equipment and the various servers 31 to 33 illustrated in FIG. 3.

A central processing unit (CPU) 301 functions as a data processing unit configured to execute various processing operations in accordance with a program stored in a read-only memory (ROM) 302 or a storage unit 308. For example, the processing described in the embodiments described above is executed. A random-access memory (RAM) 303 stores a program executed by the CPU 301, data, or the like. The CPU 301, the ROM 302, and the RAM 303 are mutually connected via a bus 304.

The CPU 301 is connected to an input/output interface 305 via the bus 304. The input/output interface 305 is connected to an input unit 306 and an output unit 307. The input unit 306 includes various switches, a keyboard, a touch panel, a mouse, a microphone, and even a state data acquisition unit such as sensor, camera, or GPS, or the like. The output unit 307 includes a display, a speaker, or the like.

Moreover, in the case of the information processing apparatus provided in the transportation apparatus 10, the input unit 306 includes the speech input unit (microphone) 111, the image input unit (camera) 112, and the sensor 113 described with reference to FIG. 4.

In addition, in the case of the information processing apparatus provided in the transportation apparatus 10, the output unit 307 includes the speech output unit (speaker) 120 and the image output unit (display unit) 122 illustrated in FIG. 4.

The CPU 301 inputs a command, status data, or the like input from the input unit 306, executes various processing, and outputs a processing result to, for example, the output unit 307.

The storage unit 308 connected to the input/output interface 305 includes, for example, a hard disk or the like and stores a program executed by the CPU 301 and various data. A communication unit 309 functions as a transmitter/receiver for performing the data communication via a network such as the Internet or local area networks and communicates with an external device.

A drive 310 connected to the input/output interface 305 drives a removable medium 311 such as a magnetic disk, an optical disk, a magneto-optical disk, or a semiconductor memory such as a memory card to record or read data.

[6. Example of Detailed Shape of Transportation Apparatus]

An example of the shape of the transportation apparatus is now described with reference to FIG. 16.

Figure 16:
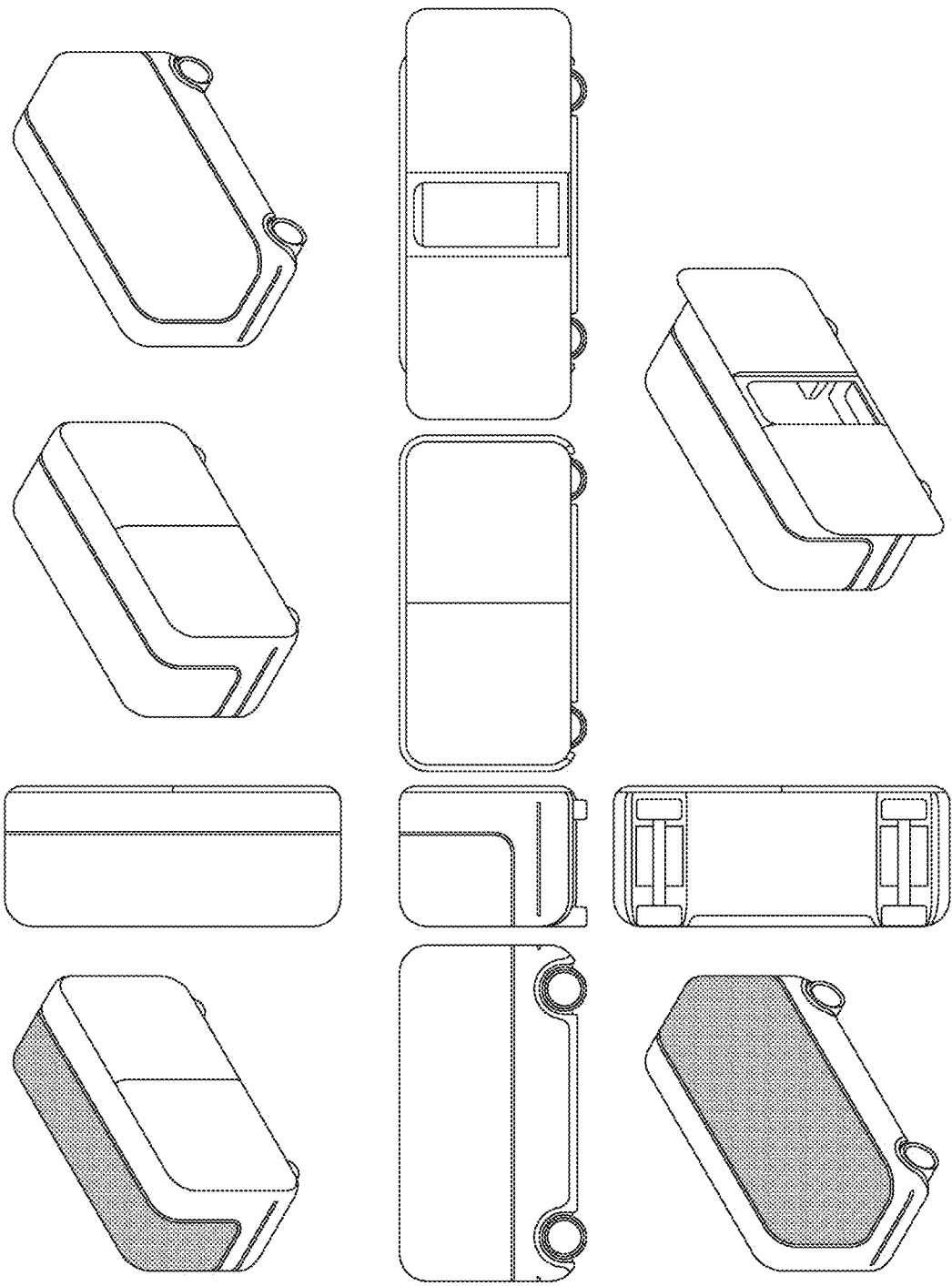
FIG. 16 is a diagram illustrated to describe in detail an exemplary configuration of a transportation apparatus.

FIGS. 16 to 18 are diagrams illustrating a configuration of a passenger car or a shuttle bus as an example of the transportation apparatus.

The transportation apparatus illustrated in FIGS. 16 to 18 is a vehicle for transporting a person such as a passenger and is a passenger car or a shuttle bus allowing for autonomous and automatic driving without operation by a person.

FIG. 16 is a diagram illustrating the entire partial design of a passenger car or a shuttle bus.

A display unit configured as a liquid crystal panel or an organic EL, or the like is provided outside the door and is used for displaying an image of a destination, a moving image for a corporate advertisement, or the like. It is possible to display an advertisement corresponding to the preference or the like of a pedestrian who walks beside the display using, for example, a means for reading information stored in an information terminal carried by a pedestrian. When the door is opened right and left from the center, an entrance for getting on and off appears.

In the figure, the parts shown in light black have transparency. In other words, it functions as a window for a passenger on board to view the outside scenery.

FIG. 17 illustrates a partial design as a passenger car or a shuttle bus. The dashed line indicates an area as a partial design and does not constitute an external shape.

The partial design including a drawing showing the open state is configured. The description is omitted because it is the same as that of the overall design described with reference to FIG. 16.

FIG. 18 illustrates a partial design as a passenger car or a shuttle bus. The dashed line indicates an area as a partial design and does not constitute an external shape.

The partial design including a drawing showing the open state is configured. The description is omitted because it is the same as that of the overall design described with reference to FIG. 16.

[7. Summary of Configuration of Present Disclosure]

The embodiments of the present disclosure have been described in detail with reference to the specific embodiments. However, it is self-evident that those skilled in the art can make modifications and substitutions of the embodiments within a scope not departing from a gist of the present disclosure. In other words, the present invention has been disclosed in the form of exemplification, and should not be interpreted restrictively. In order to determine the gist of the present disclosure, the scope of claims should be taken into consideration.

Moreover, the technology disclosed herein may include the following configuration.

(1) An information processing apparatus including:
a display unit provided on an outer side of a transportation apparatus; and
an image control unit configured to execute control of a display image on the display unit,
in which the image control unit
executes control to change the display image on the display unit depending on a traveling state of the transportation apparatus.

(2) The information processing apparatus according to (1), further including:
a data analysis unit configured to analyze the traveling state of the transportation apparatus on the basis of input information from a sensor,
in which the display control unit
executes the control to change the display image on the display unit on the basis of an analysis result obtained by the data analysis unit.

(3) The information processing apparatus according to (1) or (2), further including:
a data analysis unit configured to analyze whether the transportation apparatus is accelerating, decelerating, or constant speed traveling on the basis of input information from a sensor,
in which the display control unit
executes the control to change the display image on the display unit depending on each state whether the transportation apparatus is accelerating, decelerating, or constant speed traveling.

(4) The information processing apparatus according to any one of (1) to (3),
in which the image control unit
generates and displays an augmented reality (AR) image using a real object near the transportation apparatus on the display unit.

(5) The information processing apparatus according to (4),
in which the image control unit
generates and displays, on the display unit, the AR image using the real object opposite to a side surface of the transportation apparatus where the display unit is placed.

(6) The information processing apparatus according to (4) or (5), in which the AR image is an image in which an animation image moves along a contour of the real object.

(7) The information processing apparatus according to any one of (1) to (6),
in which the image control unit
executes control to update the display image on the display unit provided on a side surface of the transportation apparatus in such a way to flow backward from a traveling direction of the transportation apparatus.

(8) The information processing apparatus according to any one of (1) to (7),
in which the image control unit
changes the display image on the display unit provided on a side surface of the transportation apparatus depending on a line-of-sight direction of a user looking at the display unit.

(9) The information processing apparatus according to any one of (1) to (8),
in which the image control unit
causes advertising information for a store near the transportation apparatus to be displayed on the display unit.

(10) The information processing apparatus according to (9),
in which information processing apparatus
detects a position of the transportation apparatus on the basis of input information from a sensor and causes the advertising information of the store near the transportation apparatus to be displayed on the display unit depending on the detected position.

(11) An information processing apparatus including:
a display unit provided on an outer side of a transportation apparatus;
an image control unit configured to execute control of a display image on the display unit; and
a camera functioning as an image input unit configured to capture an image around the transportation apparatus,
in which the image control unit
executes control to change the display image on the display unit depending on a result obtained by analyzing a user around the transportation apparatus on the basis of the image captured by the camera.

(12) The information processing apparatus according to (11),
in which the information processing apparatus
executes processing for providing a service to the user, as the result obtained by analyzing the user around the transportation apparatus on the basis of the image captured by the camera, in a case where a fact that the user performs a prescribed action is confirmed.

(13) The information processing apparatus according to (12), in which the processing for providing the service is processing for transmitting a coupon to user equipment held by the user.

(14) A transportation apparatus including:
a display unit provided on an outer side of the transportation apparatus;
an image control unit configured to execute control of a display image on the display unit; and
a sensor configured to detect a traveling state of the transportation apparatus,
in which the image control unit
executes control to change the display image on the display unit depending on the traveling state of the transportation apparatus analyzed from information detected by the sensor.

(15) The transportation apparatus according to (14), further including:
a camera functioning as an image input unit configured to capture an image around the transportation apparatus,
in which the image control unit
executes the control to change the display image on the display unit depending on a result obtained by analyzing a user around the transportation apparatus on the basis of the image captured by the camera.

(16) The transportation apparatus according to (15),
in which the transportation apparatus
executes processing for providing a service to the user, as the result obtained by analyzing the user around the transportation apparatus on the basis of the image captured by the camera, in a case where a fact that the user performs a prescribed action is confirmed.

(17) An information processing method executed in an information processing apparatus including
an image control unit configured to execute control of a display image on a display unit provided on an outer side of a transportation apparatus,
in which the image control unit
executes control to change the display image on the display unit depending on a traveling state of the transportation apparatus.

(18) An information processing method executed in a transportation apparatus including
a display unit provided on an outer side of the transportation apparatus;
an image control unit configured to execute control of a display image on the display unit; and a sensor configured to detect a traveling state of the transportation apparatus, in which the image control unit executes control to change the display image on the display unit depending on the traveling state of the transportation apparatus analyzed from information detected by the sensor.

(19) A program causing information processing to be executed in an information processing apparatus including an image control unit configured to execute control of a display image on a display unit provided on an outer side of a transportation apparatus, in which the program causes the image control unit to execute control to change the display image on the display unit depending on the travelling state of the transportation apparatus.

Further, the series of processing described in the specification can be executed by hardware, software, or a complex configuration of the both. In a case where the processing is executed using software, it is possible to execute the processing by installing a program recording a processing sequence on a memory in a computer built into dedicated hardware or by installing a program in a general-purpose computer that can execute various processes. For example, the program can be recorded in a recording medium in advance. In addition to installing on a computer from the recording medium, it is possible to receive a program via a network, such as a local area network (LAN) and the Internet, and install the received program on a recording medium such as a built-in hard disk.

Note that various processes described in the specification not only are executed in a time-series manner according to the description but also may be executed in parallel or separately depending on the processing performance of an apparatus that executes the process or need. Furthermore, the term "system" in the present specification refers to a logical set configuration of a plurality of apparatuses, and is not limited to a system in which apparatuses of the respective configurations are provided in the same housing.

INDUSTRIAL APPLICABILITY

As described above, an embodiment of the present disclosure implements a configuration enabling control of an image displayed on the display unit provided on the outer side of the transportation apparatus, such as a bus, resulting in increasing the degree of user attention and obtaining higher advertising effects.

Specifically, for example, there are provided a display unit provided on the outer side of the transportation apparatus such as a bus and an image control unit configured to control a display image on the display unit. The image control unit controls to change a display image on the display unit depending on a traveling state of the transportation apparatus. For example, the display image is varied depending on the states of whether the transportation apparatus is accelerating, decelerating, or constant speed traveling. Alternatively, an AR image using a real object near the transportation apparatus is generated for display.

The present configuration enables control of an image displayed on the display unit provided on the outer side of the transportation apparatus, such as a bus, resulting in increasing the degree of user attention and obtaining higher advertising effects.

REFERENCE SIGNS LIST

10 Transportation apparatus
11 Display unit
12 Camera
21 User equipment
22 Signage device
31 Data processing server
32 Service providing server
33 Advertisement server
50 User
100 Information processing apparatus
110 Input unit
111 Speech input unit
112 Image input unit
113 Sensor
120 Output unit
121 Speech output unit
122 Image output unit
150 Data processing unit
160 Input data analysis unit
161 Speech analysis unit
162 Image analysis unit
163 Sensor information analysis unit
170 Storage unit
180 Output information generation unit
181 Speech control unit
182 Image control unit
190 Communication unit
200 Information processing apparatus
221 Service providing server
222 Advertisement server
230 Data processing server
301 CPU
302 ROM
303 RAM
304 Bus
305 Input/output interface
306 Input unit
307 Output unit
308 Storage unit
309 Communication unit
310 Drive
311 Removable media

The invention claimed is:

1. An information processing apparatus comprising:

a display provided on a side surface of a transportation apparatus, the side surface being an outer side of the transportation apparatus; and circuitry that includes an image controller configured to execute control of a display image on the display, wherein the image controller is configured to control a change of the display image on the display depending on a traveling state of the transportation apparatus, wherein the image controller is configured to generate and display on the display an augmented reality (AR) image using a real object near the transportation apparatus and positioned opposite to the side surface of the transportation apparatus where the display is placed.

2. The information processing apparatus according to claim 1, wherein the circuitry is further configured to analyze the traveling state of the transportation apparatus on a basis of input information from a sensor, wherein the image controller is further configured to control the change of the display image on the display on a basis of an analysis result obtained by the circuitry.

3. The information processing apparatus according to claim 1, wherein the circuitry is further configured to analyze whether the transportation apparatus is accelerating, decelerating, or constant speed traveling on a basis of input information from a sensor, wherein the image controller is further configured to control the change of the display image on the display depending on each state whether the transportation apparatus is accelerating, decelerating, or constant speed traveling.

4. The information processing apparatus according to claim 1, wherein the image controller executes control to update the display image on the display provided on the side surface of the transportation apparatus in such a way to flow backward from a traveling direction of the transportation apparatus.

5. The information processing apparatus according to claim 1, wherein the image controller is configured to change the display image on the display provided on side surface of the transportation apparatus depending on a line-of-sight direction of a user looking at the display.

6. The information processing apparatus according to claim 1, wherein the image controller is configured to cause advertising information for a store near the transportation apparatus to be displayed on the display.

7. The information processing apparatus according to claim 6, wherein the information processing apparatus detects a position of the transportation apparatus on a basis of input information from a sensor and causes the advertising information of the store near the transportation apparatus to be displayed on the display unit depending on the detected position.

8. An information processing apparatus comprising:

a display provided on a transportation apparatus; and circuitry that includes an image controller configured to execute control of a display image on the display, wherein the image controller is configured to control a change the display image on the display unit depending on a traveling state of the transportation apparatus, generate and display an augmented reality (AR) image using a real object near the transportation apparatus on the display, wherein the AR image is an image in which an animation image moves along a contour of the real object.

9. An information processing apparatus comprising:

a display provided on a side surface of a transportation apparatus, the side surface being an outer side of the transportation apparatus;

circuitry that includes an image controller configured to execute control of a display image on the display; and a camera configured to capture an image around the transportation apparatus, wherein the image controller is configured to control a change of the display image on the display depending on a result obtained by analyzing a user around the transportation apparatus on a basis of the image captured by the camera, wherein the image controller is configured to generate and display on the display an augmented reality (AR) image using a real object near the transportation apparatus and positioned opposite to the side surface of the transportation apparatus where the display is placed.

10. The information processing apparatus according to claim 9, wherein the information processing apparatus executes processing for providing a service to the user, as the result obtained by analyzing the user around the transportation apparatus on a basis of the image captured by the camera; in a case where a fact that the user performs a prescribed action is confirmed.

11. The information processing apparatus according to claim 10, wherein the processing for providing the service is processing for transmitting a coupon to user equipment held by the user.

12. A transportation apparatus comprising:

a display provided on a side surface of a transportation apparatus, the side surface being an outer side of the transportation apparatus;

a sensor configured to detect a traveling state of the transportation apparatus; and circuitry that includes an image controller configured to execute control of a display image on the display, wherein the image controller is configured to control a change of the display image on the display depending on the traveling state of the transportation apparatus analyzed from information detected by the sensor, wherein the image controller is configured to generate and display an augmented reality (AR) image using a real object near the transportation apparatus on the display, the image controller is configured to control generation of the AR image and display the AR image on the display using the real object positioned opposite to the side surface of the transportation apparatus where the display is placed.

13. The transportation apparatus according to claim 12, further comprising:

a camera configured to capture an image around the transportation apparatus, wherein the image controller executes the control to change the display image on the display depending on a result obtained by analyzing a user around the transportation apparatus on a basis of the image captured by the camera.

14. The transportation apparatus according to claim 13, wherein the transportation apparatus executes processing for providing a service to the user, as the result obtained by analyzing the user around the transportation apparatus on the basis of the image captured by the camera, in a case where a fact that the user performs a prescribed action is confirmed.

15. An information processing method executed in an information processing apparatus including
    an image controller configured to execute control of a display image on a display provided on a side surface of a transportation apparatus, the side surface being an outer side of the transportation apparatus,
    wherein the image controller is configured to
    control a change of the display image on the display depending on a traveling state of the transportation apparatus, wherein
    the image controller is configured to generate and display on the display an augmented reality (AR) image using a real object near the transportation apparatus and positioned opposite to the side surface of the transportation apparatus where the display is placed.

16. An information processing method executed in a transportation apparatus including
    a display provided on a side surface of a transportation apparatus, the side surface being an outer side of the transportation apparatus;
    an image controller configured to execute control of a display image on the display; and
    a sensor configured to detect a traveling state of the transportation apparatus,
    wherein the image controller is configured to
    control a change of the display image on the display depending on the traveling state of the transportation apparatus analyzed from information detected by the sensor, wherein
    the image controller is configured to generate and display on the display an augmented reality (AR) image using a real object near the transportation apparatus and positioned opposite to the side surface of the transportation apparatus where the display is placed.

17. A non-transitory computer-readable medium having a program with computer-readable instructions stored therein, wherein upon execution of the program by a computer causes the computer to execute steps comprising:
    executing control of a display image on a display provided on an outer side of a transportation apparatus;
    executing control to change the display image on the display depending on a traveling state of the transportation apparatus;
    generating and displaying an augmented reality (AR) image on the display using a real object near the transportation apparatus and positioned located opposite to a side surface of the transportation apparatus where the display is placed.

* * * * *